US007528983B2

(12) United States Patent
Shibata et al.

(10) Patent No.: US 7,528,983 B2
(45) Date of Patent: May 5, 2009

(54) IMAGE PROCESSING SYSTEM, INFORMATION PROCESSING APPARATUS AND METHOD, IMAGE PROCESSING APPARATUS AND METHOD, RECORDING MEDIUM, AND PROGRAM

(75) Inventors: Yoshiaki Shibata, Kanagawa (JP); Kazuhiko Sayama, Kanagawa (JP); Seiji Kawa, Kanagawa (JP); Manabu Hatakenaka, Kanagawa (JP); Takao Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 11/136,042

(22) Filed: May 24, 2005

(65) Prior Publication Data
US 2005/0270588 A1 Dec. 8, 2005

(30) Foreign Application Priority Data
May 26, 2004 (JP) ............................. 2004-156746

(51) Int. Cl.
*G06K 15/00* (2006.01)
(52) U.S. Cl. ..................... 358/1.16; 358/1.15; 358/452; 358/537; 707/1; 707/2; 707/3; 707/203; 709/201; 709/202; 709/203; 709/216; 709/217; 709/218; 709/219
(58) Field of Classification Search .............. 348/218.1; 358/452, 537
See application file for complete search history.

(56) References Cited

U.S. PATENT DOCUMENTS 5,978,523 A * 11/1999 Linford et al. .............. 382/305
6,005,678 A * 12/1999 Higashida et al. ........... 358/452
6,005,972 A * 12/1999 Fredlund et al. ............ 382/176
6,357,658 B1 * 3/2002 Garczynski et al. ..... 235/462.01
6,654,030 B1 * 11/2003 Hui ............................ 715/720
6,952,712 B2 * 10/2005 Yoshimura et al. .......... 709/201
7,071,942 B2 * 7/2006 Zaima et al. ................. 345/473
7,076,478 B2 * 7/2006 O'Rourke et al. ............... 707/3
7,149,409 B2 * 12/2006 Ohnishi ....................... 386/52
7,218,836 B2 * 5/2007 Kotani ......................... 386/46
7,246,313 B2 * 7/2007 Sung et al. .................. 715/202
7,269,601 B2 * 9/2007 Kinno et al. ............. 707/104.1
2002/0097449 A1 * 7/2002 Ishii ........................... 358/452
2004/0034622 A1 * 2/2004 Espinoza et al. ............... 707/1
2004/0125423 A1 * 7/2004 Nishi et al. .................. 358/537

FOREIGN PATENT DOCUMENTS

JP 2002 300522 * 10/2002
JP 2004 102926 * 4/2004

* cited by examiner

Primary Examiner—King Y Poon
Assistant Examiner—Richard Z Zhu
(74) Attorney, Agent, or Firm—Frommer, Lawrence & Haug LLP; William S. Frommer; Thomas F. Presson

(57) ABSTRACT

An image processing system includes an information processing apparatus for editing edit text data for processing an image and converting the edit text data into a command for processing the image, and an image processing apparatus for processing the image on the basis of the command. The information processing apparatus includes an editing section, a command conversion section, a processing section, an image conversion section, and an output section. The image processing apparatus includes an obtaining section, a recognition section, and a processing section.

9 Claims, 21 Drawing Sheets

FIG. 6

```
1  <smil xmlns="urn:schemas-com:pro:smilpro:lims" ··· >
2    <head>
3      <meta name="smpte-umid" content="060A2B3401010105···"/>
4      <layout>
5  <!-- Layout Definition -->
6      <root-layout width="1920" height="1080" backgroundColor="black"/>
7      <region id="logo" top="70" left="100" width="300" height="200" fit="meet"/>
8      <region id="super" top="40%" left="30%" width="40%" height="20%"/>
9      <region id="lims_logo" top="340" left="685" width="550" height="400" fit="meet"/>
10     <region id="text1" top="20%" left="15%" width="80%" height="10%"/>
11     <region id="text2" top="68%" left="10%" width="80%" height="10%"/>
12     </layout>
13     <timeScale id="ntsc" type="smpte-df" scale="30/1.001Hz"/>
14 <!-- Effect Definition -->
15     <transition id="fadeIn" dur="00:00:00:15" type="fade" subtype="fadeFromColor"/>
16     <transition id="fadeOut" dur="00:00:00:15" type="fade" subtype="fadeToColor"/>
17     <transition id="crossfade" dur="00:00:01:00" type="fade" subtype="crossfade"/>
18     <transition id="wipe1" dur="00:00:01:00" type="ellipseWipe">
19       <param name="slope" value="1"/>
20     </transition>
21     <transformation id="cc1" type="colorEffect" subtype="colorCorrection">···</transformationFilter>
22   </head>
23   <body timeScale="ntsc">
24     <par>
25 <!-- Video Description -->
26       <video src="···¥DaisetuRev.mxf" clipBegin="00:00:00:00" clipEnd="00:00:10:00" begin="00:00:05:00"
27         end="00:00:13:00" transIn="wipe1"/>
28       <video src="···¥DaisetuRev.mxf" clipBegin="00:00:25:00" clipEnd="00:00:35:00" begin="00:00:12:00"
29         end="00:00:22:00" transIn="crossfade" transOut="fadeOut">
30         <transformationFilter type="colorEffect" subtype="colorCorrection">···</transformationFilter>
31       </video>
32 <!-- Image Description -->
33       <img src="···¥logo.png" begin="00:00:00:00" region="logo" opacity="0.5">··· </img>
34       <img src="···¥logo_LIMS_450x300.png" begin="00:00:04:00" dur="00:00:28:00" ··· > ··· </img>
35         <transformationFilter type="colorEffect" subtype="colorCorrection">
36           <param name="hue" value="90"/>
37           <param name="brightness" value="0.5"/>
38           <param name="saturation" value="1.5"/>
39         </transformationFilter>
40       </img>
41 <!-- Text Description -->
42       <text src="text:Welcome to" begin="00:00:00:00" dur="00:00:03:00" region="super"
43         transIn="fadeIn" transOut="fadeOut">
44         <param name="fontFamily" value="Times New Roman"/>
45         <param name="fontSize" value="70"/>
46       </text>
47       <text src="text:Leveraged" begin="00:00:14:00" dur="00:00:03:00" region="text1" ···> ··· </text>
48       <text src="text:Leveraged Image" begin="00:00:16:00" dur="00:00:03:00" ··· > ··· </text>
49       <text src="text:Leveraged Image & Motion-picture" begin="00:00:18:00" ··· > ··· </text>
50       <text src="text:Leveraged Image & Motion-picture System" ··· >···</text>
51       <text src="text:System" begin="00:00:22:00" ··· > ··· </text>
52     </par>
53   </body>
54 </smil>
```

FIG. 8

```
1  <smil xmlns="urn:schemas-sony-com:pro:smilpro:lims" ...>
2   <head>
3    <!-- Layout Definition -->
4    <layout>
5     <root-layout width="1920" height="1080" backgroundColor="black"/>
6     <region id="super" top="40%" left="30%" width="40%" height="20%"/>
7    </layout>
    ..
8   <body timeScale="ntsc">
9    <par>
10    <!-- Video Description -->
      ..
11    <!-- Image Description -->
      ..
12    <!-- Text Description -->
13    <text src="text:Welcome to" begin="00:00:00:00" dur="00:00:03:00" region="super" transIn="fadeIn" transOut="fadeOut">
14     <param name="fontFamily" value="Times New Roman"/>
15     <param name="fontSize" value="70"/>
16     <param name="fontStyle" value="normal"/>
17     <param name="fontWeight" value="normal"/>
18     <param name="textDecoration" value="none"/>
19     <param name="fontColor" value="white"/>
20     <param name="letterSpacing" value="10px"/>
21     <param name="fringeSize" value="5px"/>
22     <param name="fringeColor" value="black"/>
23     <param name="horizontalAlign" value="center"/>
24     <param name="verticalAlign" value="middle"/>
25     <param name="wordWrap" value="true"/>
26    </text>
    ..
27   </par>
28  </body>
29 </smil>
```

"768, 216, Welcome to, Times New Roman, 70, normal, normal, none, 00000000, FFFFFF00, 10, 5, 000000FF, center, middle, true, 0, 0, 0, 0"

"59b43bee7ac80d236c76548ac6b825be"

"768, 216, YOKOSO (WELCOME), Times New Roman, 70, normal, normal, none, 00000000, FFFFFF00, 10, 5, 000000FF, center, middle, true, 0, 0, 0, 0"

"c24145da9ec694c0470f52c15f87e926"

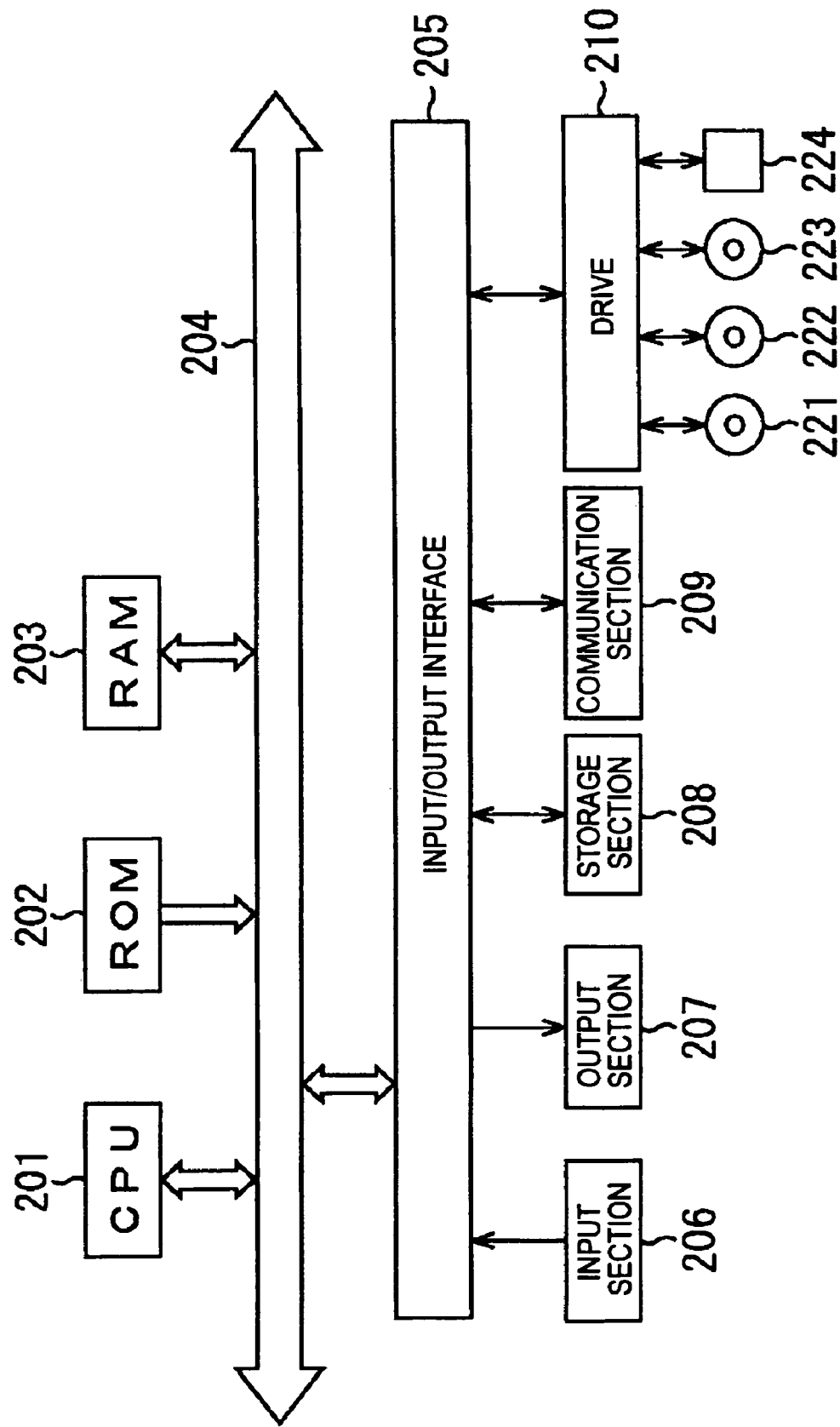

IMAGE PROCESSING SYSTEM, INFORMATION PROCESSING APPARATUS AND METHOD, IMAGE PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2004-156746 filed in the Japanese Patent Office on May 26, 2004, the entire contents of which are incorporated herein by reference.

BACKGROUND OF THE INVENTION

1. Field of the Invention

The present invention relates to an image processing system, an information processing apparatus and method, an image processing apparatus and method, a recording medium, and a program. More particularly, the present invention relates to an image processing system capable of editing a method of displaying video material in real time and easily displaying image material and subtitles in an overlapping manner, an information processing apparatus and method for use therewith, an image processing apparatus and method for use therewith, a recording medium for use therewith, and a program for use therewith.

2. Description of the Related Art

Hitherto, in the production field of news programs, etc., programs are produced by an operation of extracting desired portions from among a large amount of AV (Audio Visual) data, which has been collected in advance, and thereafter, splicing together these pieces of data.

However, it is a difficult operation to extract desired portions by remembering a covered situation from an enormous amount of AV data. Thus, a time-consuming operation of repeatedly playing back pieces of AV data one by one and confirming it while viewing this data, and finding and extracting a desired portion needs to be performed.

Therefore, in order to resolve such time-consuming and effort of program productions, for example, a technology has been proposed in which AV data and situations during material gathering time are made easier to manage by recording information during material gathering time into a common disc-shaped recording medium conforming with all devices, such as an imaging apparatus used for collecting data and an editing apparatus (see Japanese Unexamined Patent Application Publication No. 11-088821).

SUMMARY OF THE INVENTION

In the video production of the related art, necessary portions of original AV data are actually cut out and are spliced together. Furthermore, when a predetermined effect is applied (when a predetermined image effect process is performed on AV data), first, AV data serving as original material is input, and AV data serving as secondary material in which effects are applied is combined therewith and is inserted at a desired place. In addition, in a still image and a subtitles image to be displayed overlappingly with AV data, the AV data of a still image and subtitles, which is combined by a separately provided tool (for example, a telopper), is generated. Then, it is common practice that AV data of the still image and the subtitles, which is combined by the tool, is combined with the image at the above-mentioned insertion place.

As a result, there is a problem in that, since the editing steps become sequential, it takes time and effort. Another problem is that, when the original AV data is provided in a compressed format, the image quality becomes deteriorated. Furthermore, since identical processing is necessary even for a slight change (for example, shortening, replacement of subtitles, etc.) of the final AV data after being combined, a large amount of effort is necessary.

As an example of a batch editing process by inputting a video edit decision list, a system using a so-called EDL (Edit Decision List) exists. The EDL is unique to a specific editing system, and in particular, when making a reference from the EDL to material to be edited, a method specific to an editing system is used. As a result, there is a problem in that it is difficult to manage the EDL in a form beyond a specific editing system. This problem applies the same to, in addition to a linear editing system of the related art using the so-called EDL, all the non-linear editing systems having a dedicated project file.

Furthermore, in the editing system of the related art, only material based on a specific recording format and a video edit decision list (EDL) based on a specific representation method are made to be objects to be processed. As a result, a clear distinction is not made between the material recording format and the video edit decision list representation method, which are determined as inputs for the editing system; and the specification inside the system. As a result, it is necessary to re-design from the beginning the system itself in order to develop the editing system to another recording format and another representation method, thereby necessitating a large amount of time and effort.

The present invention has been made in view of such a situation. It is desirable to be capable of editing a method of displaying video material in real time and easily displaying image material and subtitles in an overlapping manner.

According to an embodiment of the present invention, there is provided an image processing system including: an information processing apparatus; and an image processing apparatus, wherein the information processing apparatus includes an editing section editing edit text data for processing a first image; a command conversion section converting the edit text data edited by the editing section into a command that can be recognized by the image processing apparatus; a processing section processing a second image used for processing the first image based on the edit text data, or subtitles text, on the basis of the edit text data; an image conversion section converting the second image or the subtitles text processed by the processing section into an image in a predetermined format; and an output section outputting the command and the image in the predetermined format to the image processing apparatus, and wherein the image processing apparatus includes an obtaining section obtaining a command for processing the first image supplied from the information processing apparatus, and the image in the predetermined format in which the second image or the subtitles text is processed; a recognition section recognizing the command obtained by the obtaining section; and a processing section processing the first image by using the image in the predetermined format on the basis of the command recognized by the recognition section.

According to another embodiment of the present invention, there is provided an information processing apparatus including: an editing section editing edit text data for processing a first image; a command conversion section converting the edit text data edited by the editing section into a command that can be recognized by the image processing apparatus; a processing section processing a second image used for processing the first image based on the edit text data, or subtitles text, on the basis of the edit text data; an image conversion section converting the second image or the subtitles text processed by the processing section into an image in a predetermined format; and an output section outputting the command and the image in the predetermined format to the image processing apparatus.

The edit text data may contain information indicating the definition of layout, information indicating the definition of effects, information indicating a method for displaying the first image, information indicating a method for displaying the second image, and information indicating a method for displaying the text used as subtitles.

When the second image used for processing the first image based on the edit text data or the text used as subtitles is processed on the basis of the edit text data, the processing section may process the information of the second image and the text used as subtitles on the basis of the information indicating the method for displaying the second image and the information indicating the method for displaying text used as subtitles, respectively.

The information processing apparatus may further include an identifier generation section generating an identifier for identifying the information of the second image or the text used as subtitles processed by the processing section.

The identifier generation section may generate an identifier by using a parameter contained in the information indicating the method for displaying the second image or contained in the information indicating the method for displaying the text used as subtitles processed by the processing section.

The identifier generation section may calculate a hashed value by using a parameter contained in the information indicating the method for displaying the second image or contained in the information indicating the method for displaying the text used as subtitles processed by the processing section, and may generate an identifier from the hashed value.

The information processing apparatus may further include: an identifier storage section storing the identifier generated by the identifier generation section; and a determination section determining whether or not the identifier generated by the identifier generation section is stored in advance in the identifier storage section, wherein, only when the determination result of the determination section shows that the identifier generated by the identifier generation section is not stored in the identifier storage section, the processing section may process the second image used for the processing on the first image based on the edit text data, or the subtitles text, on the basis of the edit text data.

The information processing apparatus may further include: a specification data obtaining section obtaining specification data of the image processing apparatus; and a command storage section storing a command that can be recognized for each piece of the specification data of the image processing apparatus, wherein the command conversion section may convert the edit text data edited by the editing section into a command that can be recognized by the image processing apparatus on the basis of the specification data of the image processing apparatus, the specification data being obtained by the specification data obtaining section.

According to another embodiment of the present invention, there is provided an information processing method including the steps of: editing edit text data for processing a first image; converting the edit text data edited in the editing step into a command that can be recognized by an image processing apparatus; processing a second image used for processing the first image based on the edit text data, or subtitles text, on the basis of the edit text data; converting the second image or the subtitles text processed in the processing step into an image in a predetermined format; and outputting the command and the image in the predetermined format to the image processing apparatus.

According to another embodiment of the present invention, there is provided a first recording medium having recorded thereon a program including the steps of: controlling the editing of edit text data for processing a first image; controlling the conversion of the edit text data edited in the editing control step into a command that can be recognized by an image processing apparatus; controlling the processing of a second image used for processing the first image based on the edit text data or the processing of subtitles text, on the basis of the edit text data; controlling the conversion of the second image or the subtitles text processed in the processing control step into an image in a predetermined format; and controlling the output of the command and the image in the predetermined format to the image processing apparatus.

According to another embodiment of the present invention, there is provided a first program for enabling a computer to execute the steps of: controlling the editing of edit text data for processing a first image; controlling the conversion of the edit text data edited in the editing control step into a command that can be recognized by an image processing apparatus; controlling the processing of a second image used for processing the first image based on the edit text data or the processing of subtitles text, on the basis of the edit text data; controlling the conversion of the second image or the subtitles text processed in the processing control step into an image in a predetermined format; and controlling the output of the command and the image in the predetermined format to the image processing apparatus.

According to another embodiment of the present invention, there is provided an image processing apparatus including: an obtaining section obtaining a command for processing a first image supplied from an information processing apparatus, and an image in a predetermined format in which a second image or subtitles text is processed; a recognition section recognizing the command obtained by the obtaining section; and a processing section processing the first image by using the image in the predetermined format on the basis of the command recognized by the recognition section.

The image processing apparatus may further include: a specification data storage section storing its own specification data; and a supply section supplying its own specification data stored in the specification data storage section to the information processing apparatus.

According to another embodiment of the present invention, there is provided an image processing method including the steps of: obtaining a command for processing a first image supplied from an information processing apparatus, and an image in a predetermined format in which a second image or subtitles text is processed; recognizing the command obtained in the obtaining step; and processing the first image by using the image in the predetermined format on the basis of the command recognized in the recognition step.

According to another embodiment of the present invention, there is provided a second recording medium having recorded thereon a program including the steps of: controlling the obtainment of a command for processing a first image supplied from an information processing apparatus, and an image in a predetermined format in which a second image or subtitles text is processed; controlling the recognition of the command obtained in the obtaining control step; and controlling the processing of the first image by using the image in the predetermined format on the basis of the command recognized in the recognition control step.

According to another embodiment of the present invention, there is provided a second program for enabling a computer to execute the steps of: controlling the obtainment of a command for processing a first image supplied from an information processing apparatus, and an image in a predetermined format in which a second image or subtitles text is processed; controlling the recognition of the command obtained in the obtaining control step; and controlling the processing of the first image by using the image in the predetermined format on the basis of the command recognized in the recognition control step.

In the image processing system according to the embodiment of the present invention, by using the information processing apparatus, edit text data for processing a first image is edited; the edited edit text data is converted into a command that can be recognized by the image processing apparatus; a second image used for processing the first image based on the edit text data, or subtitles text is processed on the basis of the edit text data; the processed second image or the processed subtitles text is converted into an image in a predetermined format; and the command and the image in the predetermined format are output to the image processing apparatus. By using the image processing apparatus, the command for processing the first image that is supplied from the information processing apparatus, and the image in the predetermined format, in which the second image or the subtitles text is processed, are obtained; the obtained command is recognized; and based on the recognized command, the first image is processed by using the image in the predetermined format.

In the information processing apparatus and method, and the first program according to the embodiments of the present invention, edit text data for processing a first image is edited; the edited edit text data is converted into a command that can be recognized by the image processing apparatus; a second image used for processing the first image based on the edit text data, or subtitles text is processed on the basis of the edit text data; the processed second image or the processed subtitles text is converted into an image in a predetermined format; and the command and the image in the predetermined format are output to the image processing apparatus.

In the image processing apparatus and method, and the second program according to the embodiments of the present invention, a command for processing a first image that is supplied from the information processing apparatus, and an image in a predetermined format in which a second image or subtitles text is processed are obtained; the obtained command is recognized; and based on the recognized command, the first image is processed by using the image in the predetermined format.

The information processing apparatus and the image processing apparatus according to the embodiments of the present invention may be independent apparatuses, or may be blocks that perform information processing and image processing, respectively.

According to the embodiments of the present invention, it becomes possible to edit a method of displaying an image in real time and to easily display images and subtitles in an overlapping manner.

BRIEF DESCRIPTION OF THE DRAWINGS

FIG. 6 shows an example of edit text data;

FIG. 8 illustrates a method of calculating an identifier;

FIG. 21 shows the configuration of an embodiment of a personal computer.

DESCRIPTION OF THE PREFERRED EMBODIMENTS

Figure 1:
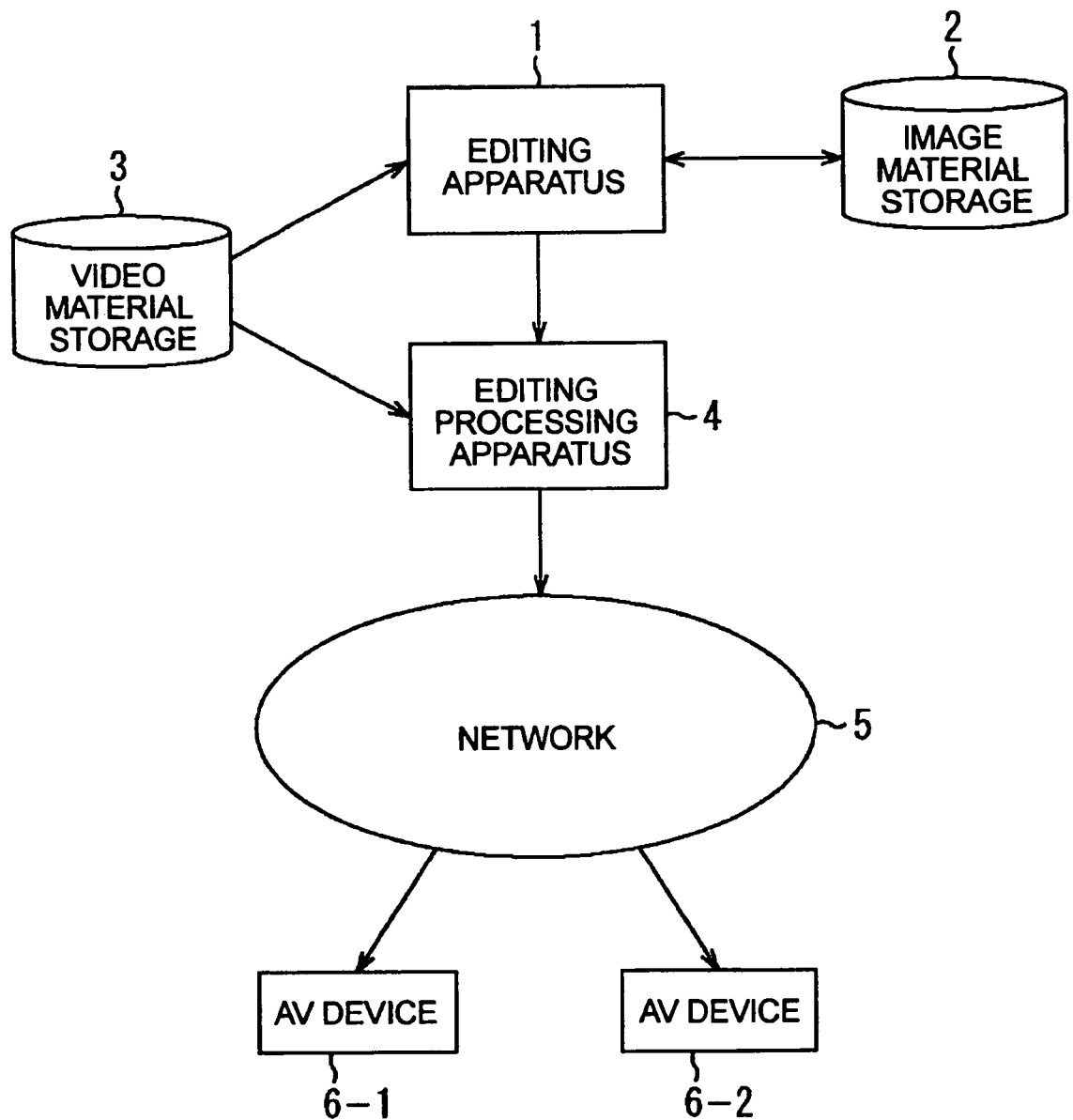
FIG. 1 illustrates an example in which an image distribution system to which an embodiment of the present invention is applied is used.

FIG. 1 shows the configuration of an embodiment of an image distribution system to which an embodiment of the present invention is applied;

An editing apparatus 1 is an apparatus having a function to edit text data, and edits edit text data for editing video material stored in a video material storage 3 in accordance with an operation of a user. More specifically, the editing apparatus 1 edits edit text data written by SMIL (Synchronized Multimedia Integration Language) in accordance with an operation of the user. In the edit text data to be edited by the editing apparatus 1, the information of the size and the layout of an image to be displayed, the definition of various effect processing, a method of displaying video material, a method of displaying image material to be added to video material, and a method of displaying subtitles text to be overlay-displayed on the video material are described.

The editing apparatus 1 converts the edit text data into a command that can be recognized by an editing processing apparatus 4 for actually editing video material and supplies the command to the editing processing apparatus 4. In the following, a description is given by assuming that the edit text data is described in the SMIL format, but the edit text data may be described in a format other than SMIL.

Furthermore, based on the edit text data, the editing apparatus 1 edits the image material stored in an image material storage 2, converts all the image material in various image formats into a bit-mapped format, and supplies it to the editing processing apparatus 4. Also, the editing apparatus 1 converts the subtitles text contained in the edit text data into a bit-mapped format, and supplies it to the editing processing apparatus 4.

In the image material storage 2, video material is stored in an MXF (Material Exchange Format) format. Also, the image material storage 2 may be in any form as long as it can store video material. For example, the image material storage 2 may be a storage device, such as a hard disk drive (HDD), provided in one of the editing apparatus 1 and the editing processing apparatus 4, or may be a dedicated server on a network 5. Furthermore, the image material storage 2 may be provided with a removable medium and a drive for allowing information recorded on the removable medium to be read. The image material storage 2 has stored therein image material in various image formats. Similarly to the video material storage 3, the image material storage 2 may be in any form as long as it can store image material.

In this embodiment, a description is given of an example in which, in the editing apparatus 1, image material and subtitles text are edited, and thereafter are converted into a bit map. However, the image format may be an image format other than a bit map. In any image format, the edited image material and the edited subtitles text are converted into a unified, predetermined image format, and are supplied to the editing processing apparatus 4.

Based on the command supplied from the editing apparatus 1, the editing processing apparatus 4 reads video material stored in the video material storage 3, generates a combined image by using the bit-map material of the image material converted on the basis of the edit text data or the bit-map material of the subtitles text, and distributes, via the network 5, the combined image to AV (Audio Visual) devices 6-1 and 6-2 formed of a television receiver, a hard disk drive (HDD) recorder, or a digital versatile disc (DVD) recorder. When the AV devices 6-1 and 6-2 do not have to be particularly distinguished from each other, they are referred to simply as the AV device 6, and this applies the same to the other components. In FIG. 1, an example in which two devices, that is, the AV devices 6-1 and 6-2, are connected to the network 5 is shown. Alternatively, three or more devices may be connected to the network 5, and video material edited using the editing processing apparatus 4 may be distributed to each AV device 6.

As a result of the above configuration, it may be said that the editing apparatus 1 and the editing processing apparatus 4 constitute an image editing system for editing video materials stored in the video material storage 3.

Figure 2:
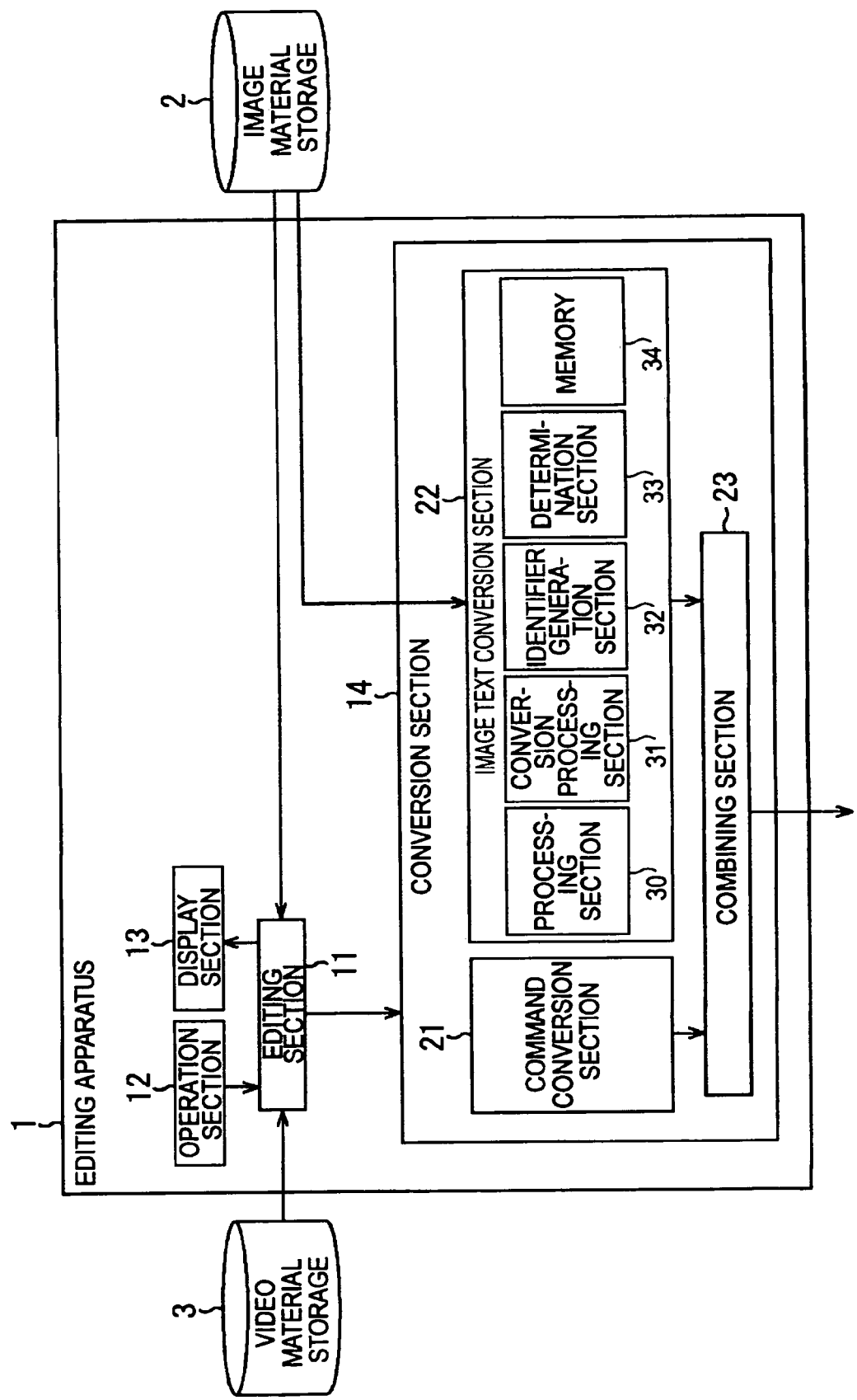
FIG. 2 shows the configuration of an editing apparatus of FIG. 1.

Next, referring to FIG. 2, the configuration of the editing apparatus 1 is described.

When an operation section 12 including a touch panel, an operation button, a keyboard, and/or a mouse is operated by the user, on the basis of the corresponding operation signal, an editing section 11 displays an editing screen of SMIL on a display section 13, generates edit text data, and outputs it to a conversion section 14. When generating the edit text data, the editing section 11 reads proxy data (low image-quality data among the video materials) of video material from the video material storage 3 and displays it as necessary.

A command conversion section 21 of the conversion section 14 converts the edit text data supplied from the editing section 11 into a command that can be recognized by the editing processing apparatus 4, and supplies it to a combining section 23. Based on the information of the method of displaying image material to be added to the video material in the edit text data and the information of the method of displaying subtitles text to be overlay-displayed on the video material, an image text conversion section 22 reads image material from the image material storage 2, processes it or processes the subtitles text, converts the processed one into an image in a bit-map format, and outputs it as bit-map material to the combining section 23.

More specifically, a processing section 30 of the command conversion section 21 processes the image material or the subtitles text on the basis of the information of the method of displaying image material to be added to the video material in the edit text data and on the basis of the information of the method of displaying subtitles text to be overlay-displayed on the video material.

Furthermore, a conversion processing section 31 converts the image material or the subtitles text processed by the processing section 30 into a bit-map material composed of image data in a bit-map format.

Furthermore, an identifier generation section 32 extracts parameters contained in the information of the method of displaying image material (still image) to be added to the video material in the edit text data and contained in the information of the method of displaying subtitles text to be overlay-displayed on the video material, also determines an identifier composed of a hashed value based on the plurality of the parameters, attaches it as the file name of the bit-map material, and stores the identifier in a memory 34.

A determination section 33 determines whether or not the identifier generated by the identifier generation section 32 exists in the memory 34, and based on the determination result, stops the processing process of the processing section 30 and the conversion process of the conversion processing section 31. That is, since the bit-map material having the file name of the same identifier has already been generated at another timing, it is assumed that a processing process and a conversion process need not to be further performed. In that case, a processing process and a conversion process are not performed. In other words, based on the determination result of the determination section 33, only when the same identifier does not exist in the memory 34, the processing section 30 and the conversion processing section 31 perform a processing process and a conversion process, respectively.

The combining section 23 combines the command that is converted and generated by the command conversion section 21 on the basis of the edit text data, and the bit-map material generated by the image text conversion section 22, and supplies it as a combined signal to the editing processing apparatus 4.

Figure 3:
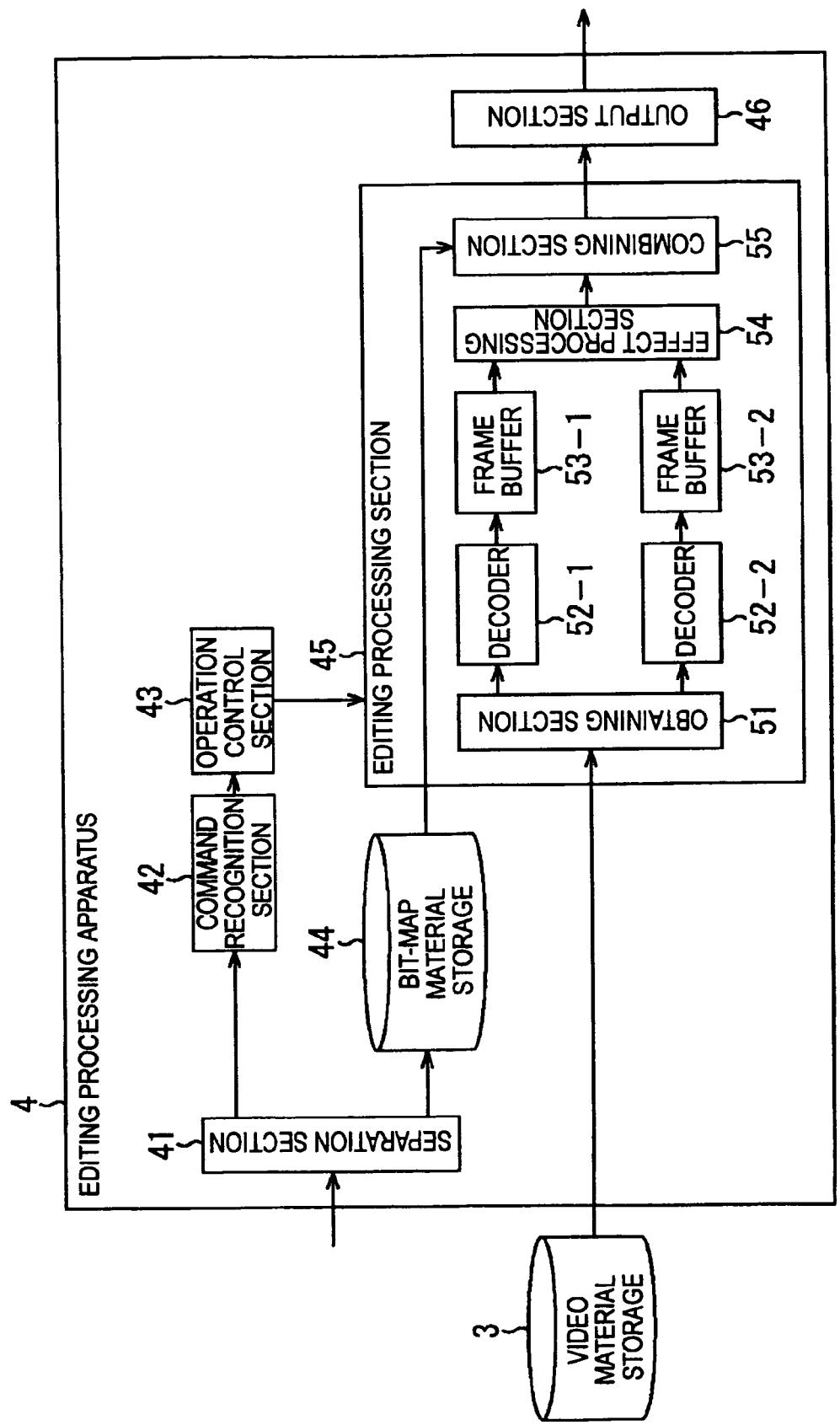
FIG. 3 shows the configuration of an editing processing apparatus of FIG. 1.

Next, referring to FIG. 3, the configuration of the editing processing apparatus 4 is described.

A separation section 41 separates the command and the bit-map material from the combined signal in which the command and the bit-map material supplied from the editing apparatus 1 are combined, and supplies them to a command recognition section 42 and a bit-map material storage 44, respectively.

The command recognition section 42 recognizes the command supplied from the separation section 41, converts it into a signal for controlling the operation of an operation control section 43, and supplies it to the operation control section 43. Based on the signal supplied from the command recognition section 42, the operation control section 43 generates a timing model, and controls the editing content and the processing timing of an editing processing section 45 in order to allow video material to be read from the video material storage 3 and also to allow bit-map material composed of image material and subtitles text to be read from the bit-map material storage 44 as appropriate. Then, the operation control section 43 performs control for the editing processing section 45 to perform an editing process using the materials and to output the editing result to an output section 46. The output section 46 distributes the video material, which is the editing result, to the AV device 6 via the network 5.

Based on the control signal of the operation control section 43, an obtaining section 51 of the editing processing section 45 reads video material stored in the video material storage 3 and supplies it to decoders 52-1 and 52-2 as appropriate. The decoders 52-1 and 52-2, which are configured identically, decode the video material, and outputs it to frame buffers 53-1 and 53-2, where the decoded video material is stored. The reason why the decoders 52-1 and 52-2 and the frame buffers 53-1 and 53-2 are each formed in two systems is that, for example, when an effect process in which two screens are combined in some form is to be performed, two video materials need to be processed in parallel, and thus, each can be decoded. Therefore, in, order to perform processing at a higher speed, they may be formed in three or more systems.

Based on the control signal from the operation control section 43, an effect processing section 54 reads the video material decoded by the frame buffers 53-1 and 53-2 at a predetermined timing, performs an effect process corresponding to the command thereon, and outputs it to a combining section 55.

Based on the control signal from the operation control section 43, the combining section 55 reads bit-map material composed of image material and subtitles text, which is stored in the bit-map material storage 44 and on which predetermined processing is performed, at a predetermined timing, combines it with the video material on which the effect process is performed, and outputs it to the output section 46.

Figure 4:
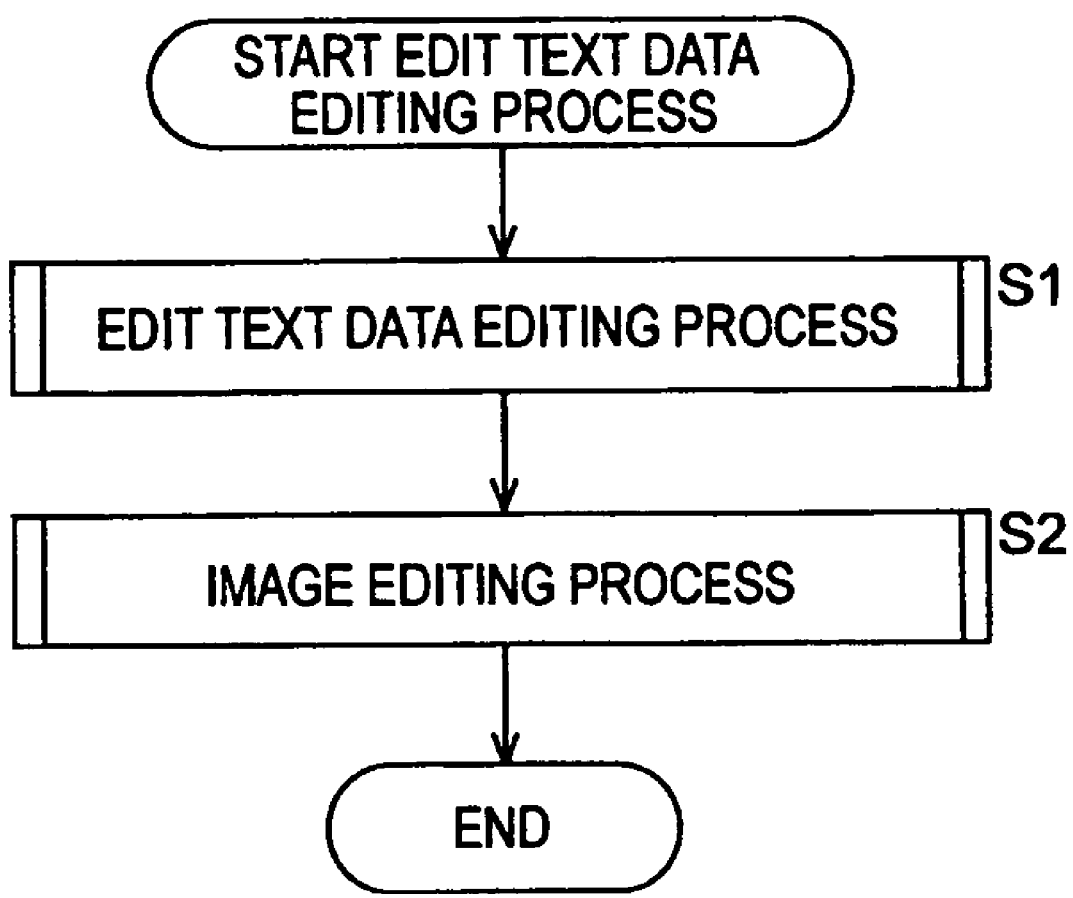
FIG. 4 is a flowchart illustrating an editing process of the image distribution system of FIG. 1.

Next, referring to the flowchart in FIG. 4, the editing process is described.

In step S1, the editing apparatus 1 performs an edit text data editing process. As a result of this process, the editing apparatus 1 edits the edit text data, converts the edit text data into a command that can be recognized by the editing processing apparatus 4, and supplies it to the editing processing apparatus 4. The edit text data editing process will be described later with reference to the flowchart in FIG. 5.

In step S2, the editing processing apparatus 4 performs an image editing process. Based on the command supplied from the editing apparatus 1 as a result of this process, the editing processing apparatus 4 reads video material from the image material storage 2, performs predetermined image processing thereon, and distributes it to the AV device 6 via the network 5. The image editing process will be described later with reference to FIG. 11.

Next, referring to the flowchart in FIG. 5, the edit text data editing process will be described below.

In step S11, the editing section 11 determines whether or not the operation section 12 is operated by the user and an edit text data editing process is requested, and repeats the process until it is determined that the edit text data editing process is requested. When it is determined in step S11 that the edit text data editing process is requested, in step S12, the editing section 11 displays the editing screen of the edit text data on the display section 13.

The edit text data is written by SMIL, and is, for example, in a form shown in FIG. 6.

In FIG. 6, the description from the first to third lines forms the header of the edit text data and is information for identifying the edit text data. The description from the 51st to 53rd lines is provided so as to correspond to the description from the first to third lines.

The description from the fourth to 13th lines in which "Layout Definition" is described in the fourth line indicates the layout definition information, and indicates the size at which the video material to be displayed finally is displayed, and also indicates the size and the position of the image material and the subtitles text desired to be arranged and displayed on an image on which the video material is displayed. In FIG. 6, the description of the sixth line defines the width and the height as the size of the image, and the background color. In the seventh to 11th lines, the position at which the image material and the subtitles text desired to be arranged and displayed on an image on which the video material is displayed start, and the width and the height as the size thereof are indicated. With regard to the size, either defining with the number of pixels by using only a numeric value or defining by a percentage with respect to the image size by describing "%" can be selected.

The description from the 14th to 24th lines in which "Effect Definition" is described in the 14th line indicates the effect definition information, and also indicates information in which various effect processing desired to be performed on the video material is defined. In FIG. 6, in the 15th to 18th lines, effect processes of fade-in, fade-out, cross fade, and wipe, are defined. In the 21st line, a transformation effect process is defined.

The description from the 25th to 31st lines in which "Video Description" is described in the 25th line indicates the method of displaying video material, and also indicates information for specifying video material to be read, and information such as the display start time for each material, the end time, effect processing content, and the start time of the effect process, etc. In FIG. 6, in the 26th and 27th lines, the method of displaying one video material is described, and in the 28th to 30th lines, the method of displaying another video material is described; thus, methods of displaying a total of two video materials are described. In the 26th and 28th lines of FIG. 6, the information for specifying the video material to be read is described as "video src=" . . . ¥DaisetuRev.mxf"" in order to describe a path indicating the position where the video material in an MXF file format of "DaisetuRev.mxf" exists. Alternatively, for example, that information may be specified by UMID (Unique Material Identifier).

The description from the 32nd to 40th lines in which "Image Description" is described in the 32nd line indicates a method of displaying image material, and the time at which a display is performed for each image material, the display area, the display period, the effect processing content, the color information, etc., are indicated.

The description from the 41st to 50th lines in which "Text Description" is described in the 41st line indicates a method of displaying subtitles text, and also indicates the content of text, the display start time, the display period, the effect processing content, the font information, etc.

As a result of the user manipulating the image displayed in step S12, the edit text data shown in FIG. 6 is generated. Then, in step S13, the editing section 11 determines whether or not an operation indicating that the edit text data editing process has been completed is performed by operating the operation section 12, and repeats the process until an operation indicating that the editing process is completed is performed. When it is determined in step S13 that an operation indicating that the editing process is completed is performed, in step S14, the editing section 11 outputs the edit text data edited by the user to the conversion section 14. Then, the command conversion section 21 of the conversion section 14 converts the supplied edit text data into a command that can be recognized by the editing processing apparatus 4, and outputs it to the combining section 23.

In step S15, the image text conversion section 22 performs an image text material conversion process and outputs a bit-map image signal, which is the processing result, to the combining section 23.

Figure 7:
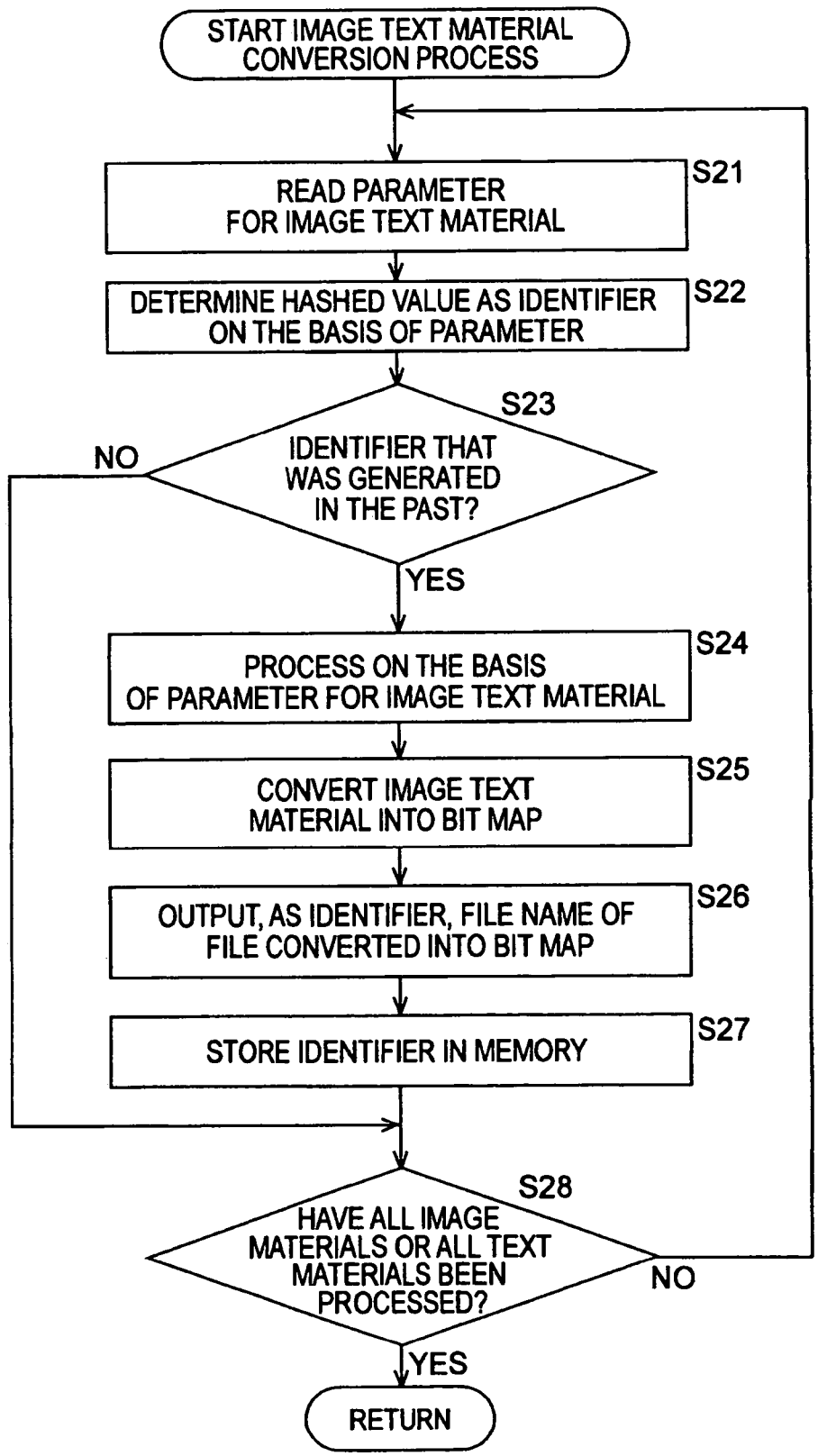
FIG. 7 is a flowchart illustrating an image text material conversion process of FIG. 5.

Referring now to the flowchart in FIG. 7, an image text material conversion process is described below.

In step S21, based on the edit text data supplied from the editing section 11, the image text conversion section 22 reads a parameter for the conversion of image text material.

In step S22, the identifier generation section 32 determines a hashed value in which a value generated on the basis of the read parameter is assumed to be an input value.

That is, for example, in the case of a description regarding the processing of subtitles text shown in FIG. 8, the image text conversion section 22 reads the following as parameters for processing subtitles:

"1920", "1080", and "black", which are values indicating the width and the height indicating the size of the display screen, and the background color in the fifth line; the values being surrounded by the frame of FIG. 8;

"40" and "20", which are values indicating the width and the height at the layout position of the subtitles in the sixth line;

"Welcome to" indicating the subtitles text in the 13th line;

"Times New Roman", which specifies the font of the subtitles in the 14th line;

"70", which specifies the font style in the 16th line;

"normal", which specifies the font width in the 17th line;

"none", which specifies the text decoration in the 18th line;

"white", which specifies the font color in the 19th line;

"10", which specifies the character spacing in the 20th line;

"5", which indicates the size of shading attached to text in the 21st line;

"black", which specifies the color of shading attached to text in the 22nd line;

"center", which specifies the horizontal center position in the 23rd line;

"middle", which specifies the vertical center position of the 24th line; and

"true", which specifies the presence or absence of word wrap in word units in the 25th line.

Furthermore, based on theses parameters, the identifier generation section 32 generates an input value of a hashed value, which is an identifier of "768, 216, Welcome to, Times New Roman, 70, normal, normal, none, 00000000, FFFFFF00, 10, 5, 000000FF, center, middle, true, 0, 0, 0, 0". Here, "768" and "216" at the beginning are values calculated on the basis of the parameters of the width and the height, respectively. That is, "768" is a value calculated from 1920× 40, and "216" is a value calculated from 1080×20. "00000000" is a value indicating "black" of the background color. "FFFFFF00" is a value indicating "white" that specifies the font color in the 19th line. "000000FF" is a value indicating "black" that specifies the color of the shade attached to the text in the 22nd line. "0, 0, 0, 0" at the end indicates a margin size in the upward direction, in the rightward direction, in the downward direction, and in the leftward direction, respectively, and all these values are 0 by default unless particularly specified otherwise.

Figure 9:
FIG. 9 illustrates an example of calculating a hashed value serving as an identifier.
Figure 10:
FIG. 10 illustrates an example of calculating a hashed value serving as an identifier.

Furthermore, with respect to the values generated on the basis of the parameters, "768, 216, Welcome to, Times New Roman, 70, normal, normal, none, 00000000, FFFFFF00, 10, 5, 000000FF, center, middle, true, 0, 0, 0, 0", the identifier generation section 32 obtains a hashed value "59b43bee7ac80d236c76548ac6b825be" composed of a hexadecimal number shown in FIG. 9 by using, for example, a message digest function MD5. For example, when "Welcome to" among the parameters, which are inputs in FIG. 9, is changed to a representation of Hiragan "ようこそ (welcome)", an input signal is "768, 216, ようこそ(welcome), Times New Roman, 70, normal, normal, none, 00000000, FFFFFF00, 10, 5, 000000FF, center, middle, true, 0, 0, 0, 0". The hashed value thereof becomes "c24145da9ec694c0470f52c15f87e926", as shown in FIG. 10. That is, as a result of determining the hashed value in the manner described above, by only changing some of the parameters, it becomes possible to generate a completely different identifier in accordance with the parameters. The function used to determine the hashed value is not restricted to MD5, and may be other functions for determining a hashed value. An input value formed of parameters is not restricted to the above examples, and may be various other parameters. For example, a file name and a description of the path that specifies the position at which the file exists may be used.

In step S23, the determination section 33 compares the identifier composed of a hashed value generated by the identifier generation section 32 with the identifier, stored in the memory 34, which is generated until then by the identifier generation section 32, in order to determine whether or not the identifier is an identifier generated in the past.

When it is determined in step S23 that, for example, the identifier is not an identifier generated in the past, in step S24, the processing section 30 processes the image material or the text used for subtitles in accordance with the edit text data by using the extracted parameters.

In step S25, the conversion processing section 31 converts the image material or the text material used for subtitles processed by the processing section 30 into an image in a bit-map format, and supplies it to the combining section 23. That is, since the image material is generated in various image formats, this is converted into a unified bit-map material. Here, all the processed image material or the processed text used for subtitles are converted into a bit-map format in a unified manner. Alternatively, in the case of processing for converting all of these into a unified image format, other image formats may be used. For example, TIFF (Tagged Image File Format), GIF (Graphic Interchange Format), or JPEG (Joint Photographic Experts Group) may be used.

In step S26, the image text conversion section 22 defines the generated bit-map material as a file and attaches, as a file name thereof, an identifier composed of the hashed value determined in step S22.

In step S27, the image text conversion section 22 newly registers the identifier used as the file name in the memory 34.

In step S28, the image text conversion section 22 determines whether or not all the image material or the text used for subtitles described in the edit text data is processed. When it is determined that all the image material or the text used for subtitles is not processed, the process returns to step S21, and processing of step S21 and subsequent steps is repeated.

On the other hand, when it is determined in step S23 that the identifier is a hashed value generated in the past, since the same processing process was performed on the same material and a bit-map material was generated in the past, processing of steps S24 to S27 is skipped.

Then, when it is determined in step S28 that all the image material described in the edit text data or the text used for subtitles is processed, the processing is completed.

As a result of the above processing, the image material or the text used for subtitles is processed in accordance with the edit text data, and is converted into a bit-map image. Thus, it becomes possible to convert the image material or the subtitles text into a unified bit-map material. Also, for the file forming each of the generated bit-map materials, an identifier composed of a hashed value generated on the basis of the parameters used for processing is attached as a file name. This makes it possible to identify the file of each bit-map material. Furthermore, as a result of storing the identifier and determining whether or not the identifier determined on the basis of the parameters used for a processing process before the processing process is performed was generated in the past, it is possible to confirm whether or not the same identifier exists, that is, whether or not the same image material or the subtitles text was processed using the same parameters in the past. Thus, by performing a processing process only when the same identifier does not exist, it is possible to not only omit an unnecessary processing process, but also suppress an increase in the load of communication due to an increase in the amount of unnecessary data and suppress an increase in the size of the recording medium.

Figure 5:
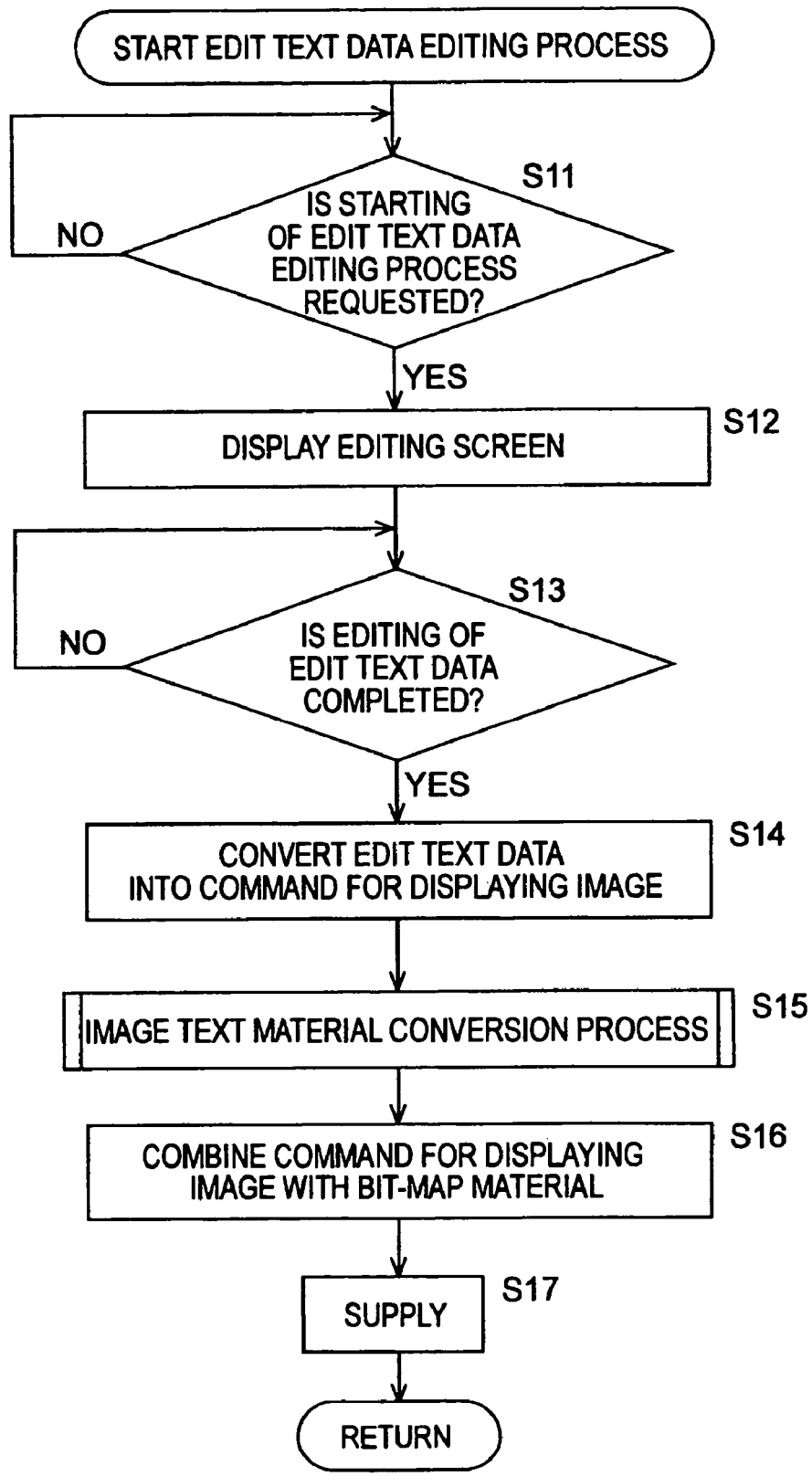
FIG. 5 is a flowchart illustrating an edit text data editing process of FIG. 4.

The description now returns to the flowchart in FIG. 5.

When, as a result of the process in step S15, the image material or the subtitles text material is processed on the basis of the edit text data and is further converted into a bit-map material, in step S16, the combining section 23 combines the command supplied from the command conversion section 21 with the bit-map material generated by the image text conversion section 22 in order to generate a combined signal.

In step S17, the combining section 23 supplies the combined signal to the editing processing apparatus 4.

As a result of the above processing, it is possible to supply, to the editing processing apparatus 4, the command that can be recognized by the editing processing apparatus 4 in accordance with the edit text data, and to supply, as bit-map material, the image material in a bit-map format used for an editing process, described in the edit text data, and the information of the text used for subtitles.

Figure 11:
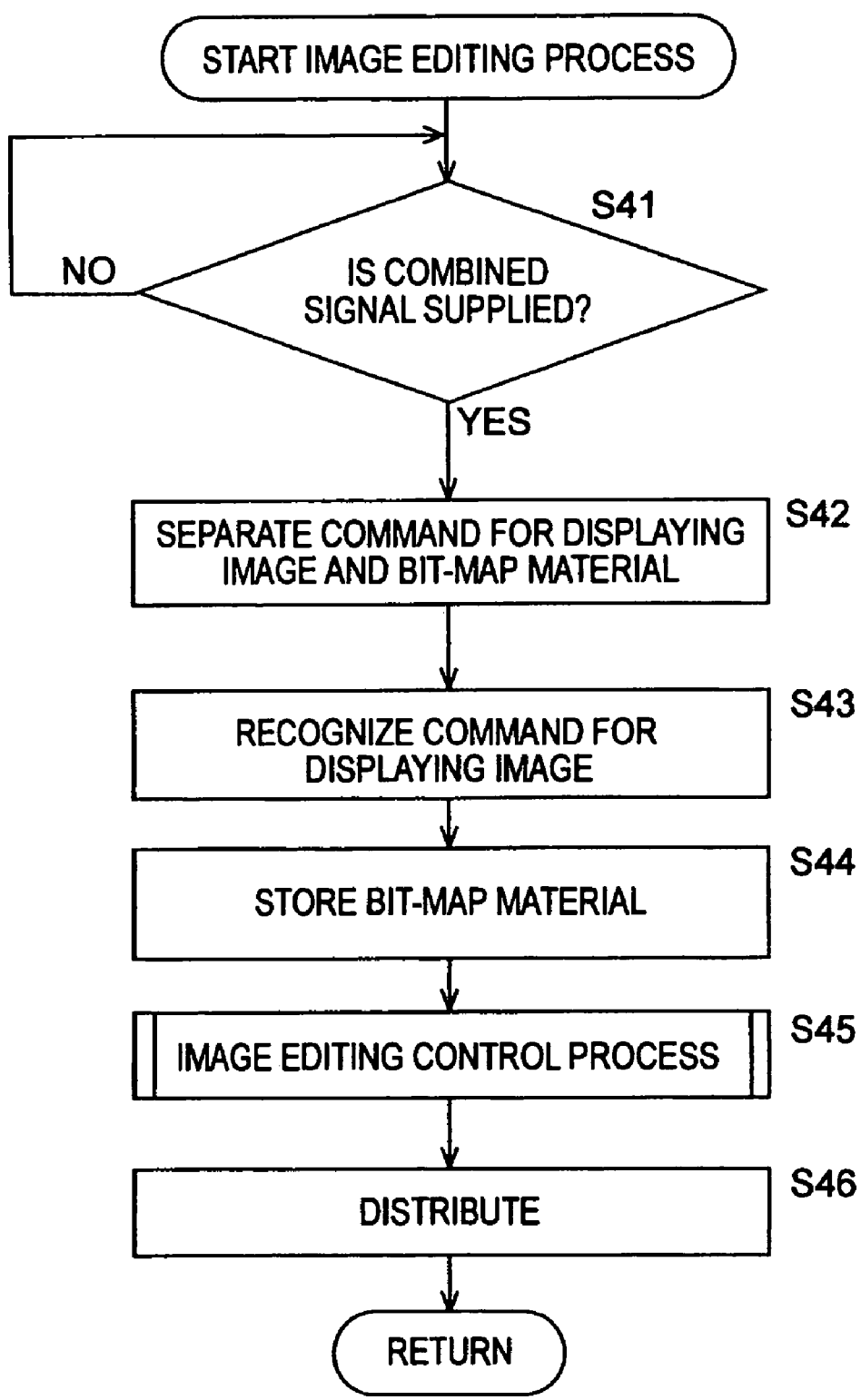
FIG. 11 is a flowchart illustrating an image editing process of FIG. 4.

Next, referring to the flowchart in FIG. 11, a description is given of an image editing process, which is a process of step S2 in the flowchart of FIG. 4.

In step S41, the separation section 41 of the editing processing apparatus 4 determines whether or not the combined signal is supplied from the editing apparatus 1, and repeats the process until the combined signal is supplied. In step S41, when, as a result of the process in step S17, the combined signal is supplied, the separation section 41 determines that the combined signal is supplied, and the process proceeds to step S42.

In step S42, the separation section 41 separates the command and the bit-map material contained in the supplied combined signal, and supplies them to the command recognition section 42 and the bit-map material storage 44, respectively.

In step S43, the command recognition section 42 recognizes the supplied command and supplies the recognition result to the operation control section 43. More specifically, based on the command, the command recognition section 42 generates a timing model for allowing the editing processing section 45 to operate. Here, the timing model defines as to what kind of process each section of the editing processing section 45 performs at what kind of timing. The operation control section 43 controls various kinds of operations of the editing processing section 45 on the basis of this timing model.

In step S44, the bit-map material storage 44 stores the supplied bit-map material.

In step S45, based on the recognition result supplied from the command recognition section 42, the operation control section 43 allows the editing processing section 45 to operate to perform an image editing control process for editing an image.

Figure 12:
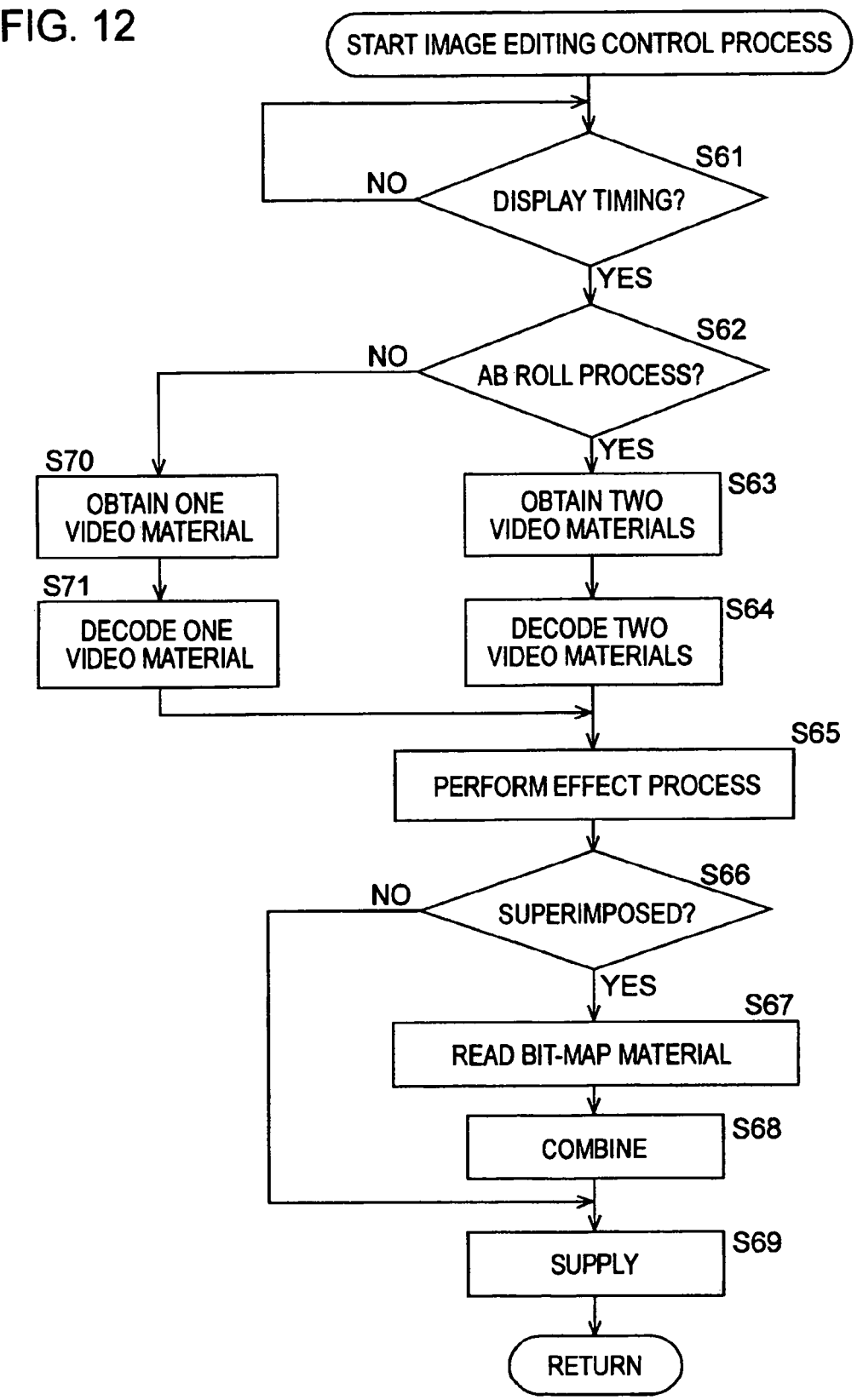
FIG. 12 is a flowchart illustrating an image editing control process of FIG. 11.

Referring now to the flowchart in FIG. 12, the image editing control process is described.

In step S61, based on the timing model, the operation control section 43 determines whether or not a display timing is present, and repeats the process until it is determined that a display timing is present. When it is determined in step S61 that a display timing is present, the process proceeds to step S62.

In step S62, based on the timing model, the operation control section 43 determines whether or not an AB roll process should be performed in which, to use an image to be displayed, two video materials are used. When it is determined in step S62 that an AB roll process should be performed, in step S63, the operation control section 43 allows the obtaining section 51 to obtain two predetermined video materials from the video material storage 3 and to supply them to the decoders 52-1 and 52-2, correspondingly.

In step S64, the decoders 52-1 and 52-2 each decode the video materials supplied from the obtaining section 51, supply them to the frame buffers 53-1 and 53-2, respectively, where they are stored.

In step S65, the operation control section 43 controls the effect processing section 54 so as to perform an effect process on the decoded video materials stored in the frame buffers 53-1 and 53-2 and to supply them to the combining section 55.

In step S66, by referring to the timing model, the operation control section 43 determines whether or not a superimposition process (process for displaying the bit-map material in such a manner as to be overlay-displayed on the video material) is contained in the effect process. When it is determined in step S66 that a superimposition process is contained, the process proceeds to step S67.

In step S67, the operation control section 43 controls the combining section 55 so as to read a predetermined bit-map material from the bit-map material storage 44. In step S68, the bit-map material is combined so that it is displayed in such a manner as to be overlay-displayed on the video material on which a predetermined effect process is performed.

In step S69, the operation control section 43 supplies the image processed by the combining section 55 to the output section 46.

On the other hand, when it is determined in step S62 that an AB roll process should not be performed, in step S70, the operation control section 43 allows the obtaining section 51 to supply one predetermined video material from the video material storage 3 to one of the decoders 52-1 and 52-2.

In step S71, the decoders 52-1 and 52-2 decode the video materials supplied from the obtaining section 51, and supply them to the frame buffers 53-1 and 53-2, respectively, where they are stored.

That is, the decoders 52-1 and 52-2 and the frame buffers 53-1 and 53-2 are formed in two systems. Alternatively, there are cases in which only one system performs processing or two systems perform processing in parallel.

When it is determined in step S66 that the superimposition process is not contained, processing of steps S67 and S68 is skipped. That is, when the superimposition process is not contained, the combining section 55 supplies the image as is, on which the effect process is performed by the effect processing section 54, to the output section 46.

The description now returns to the flowchart in FIG. 11.

In step S46, the output section 46 distributes the edited video material to the AV devices 6-1 and 6-2 via the network 5. More specifically, the output section 46 converts the edited video material so that it become signals compatible with the protocol necessary for communication in the network 5, and distributes it via the network 5.

As a result of the above processing, in the editing apparatus 1, by only editing the edit text data of the video material, it becomes possible to distribute the data in real time while the image editing process of the video material to be distributed is being performed.

In the foregoing, an example has been described in which, based on the command and the bit-map material generated by the editing apparatus 1, the editing processing apparatus 4 reads necessary video material, performs effect processing thereon, and distributes it. As a practical device configuration, the editing apparatus 1 needs only to be provided with a function for editing edit text data, a function for converting the command of the edit text data, and a function for converting the image material or the subtitles text material into a bit-map material. Therefore, the device can be realized by, for example, a PC (Personal Computer). However, there is a demand for the editing processing apparatus 4 to be capable of realizing a decoding process and a high-speed and sophisticated processing of performing effect processing on video material; therefore, dedicated hardware may be necessary.

In the editing apparatus 1, it is easy to add a new editing function because it can be formed by software using, for example, a PC. In the case of an editing function that is difficult to be represented by a command that can be recognized by the editing processing apparatus 4, even if the editing apparatus 1 generates a command in accordance with the edit text data, it is difficult for the editing processing apparatus 4 to recognize the command. As a result, there is a risk in that it is difficult to implement an image editing control process.

Accordingly, the editing apparatus 1 may be made to recognize a command that can be recognized or can be processed by the editing processing apparatus 4 so that only the command that can be realized by the editing processing apparatus 4 can be selectively used.

Figure 13:
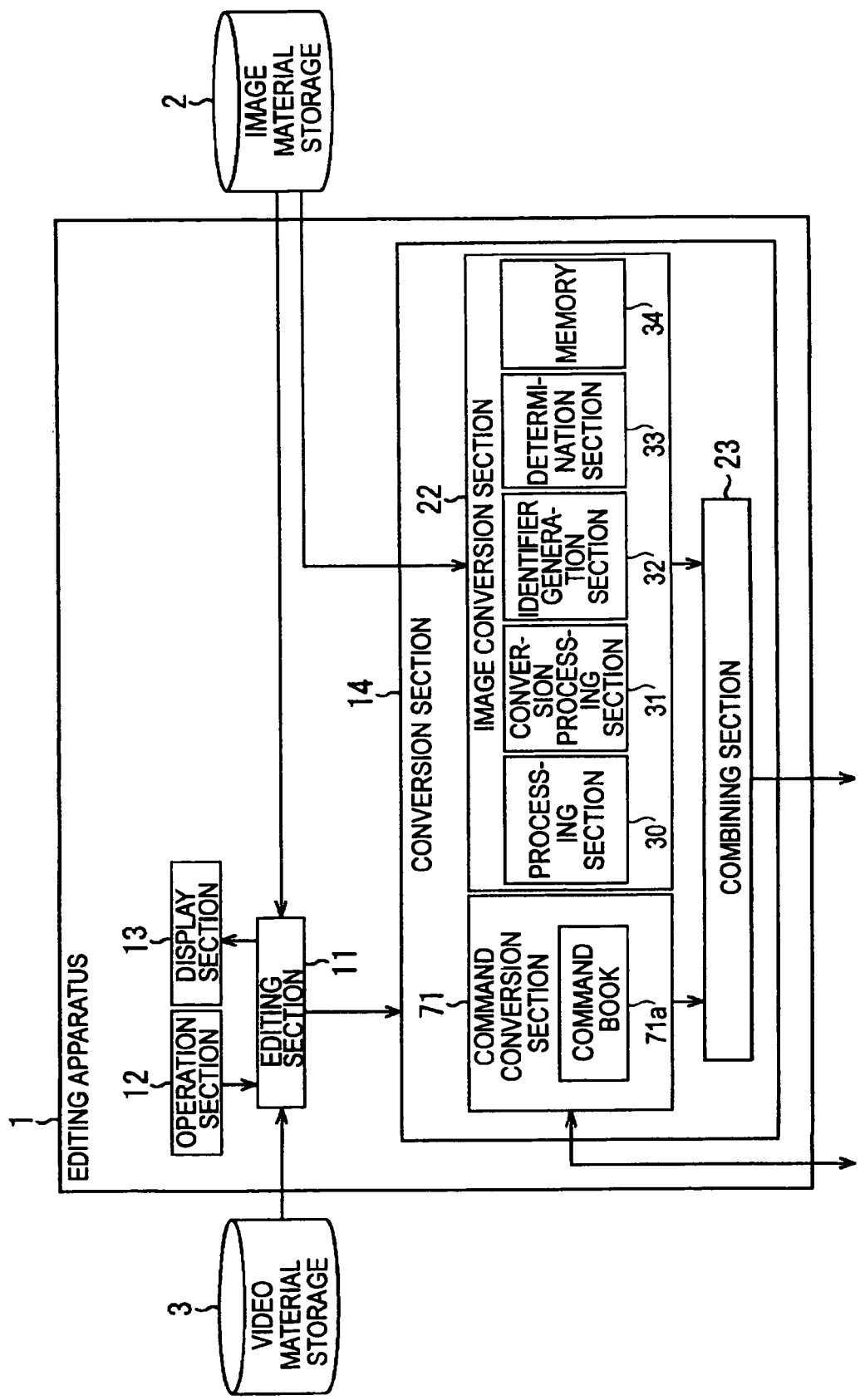
FIG. 13 shows another configuration of the editing apparatus of FIG. 2.
Figure 14:
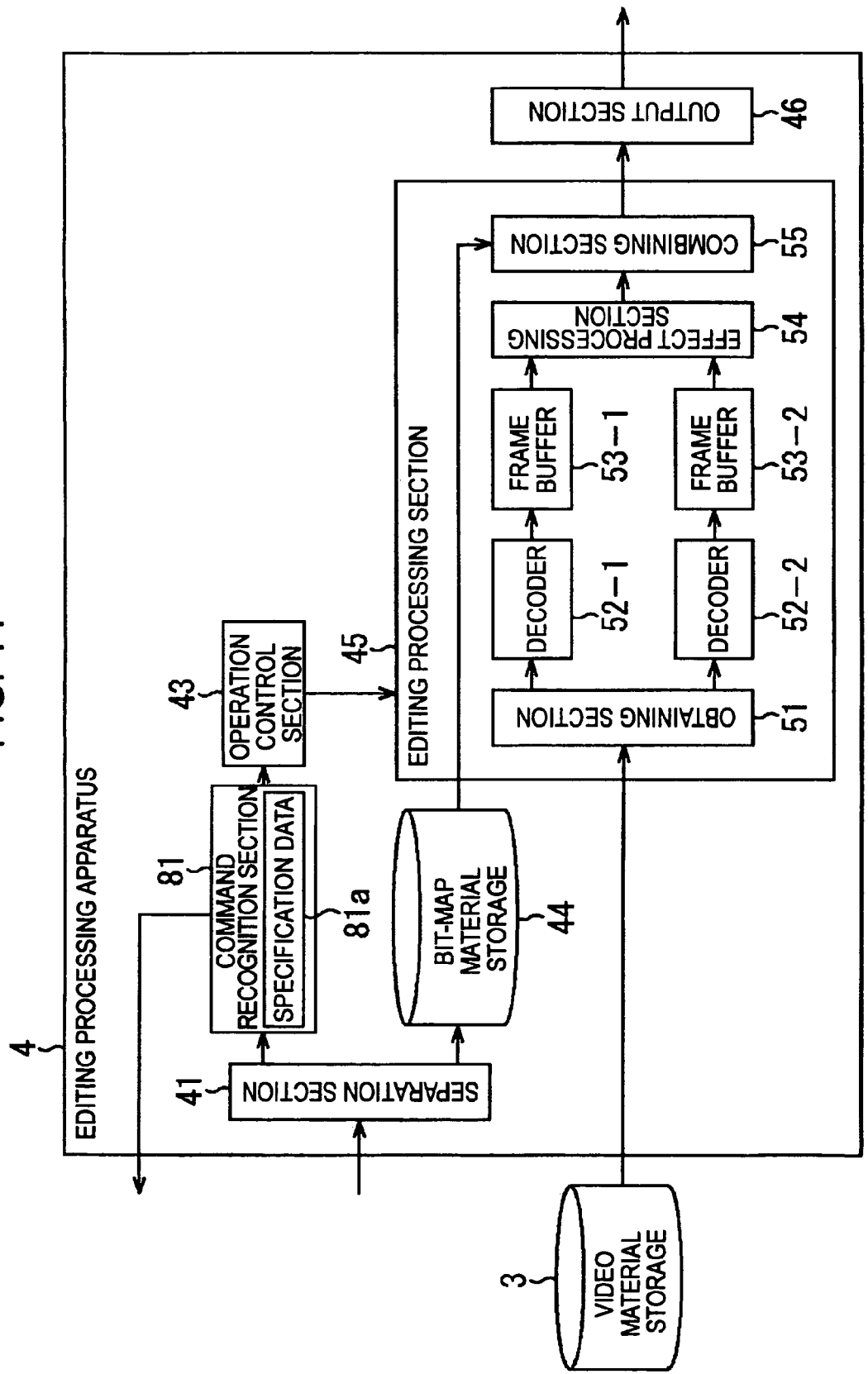
FIG. 14 shows another configuration of the editing processing apparatus of FIG. 3.

FIG. 13 shows the configuration of the editing apparatus 1 that inquires in advance the editing processing apparatus 4 of specification data, that recognizes a command that can be recognized or can be processed by the editing processing apparatus 4 in accordance with the specification data, and that can selectively use only the command that can be implemented by the editing processing apparatus 4. FIG. 14 shows the configuration of the editing processing apparatus 4 that responds the specification data to the editing apparatus 1 in response to an inquiry from the editing apparatus 1 of FIG. 13.

Components in FIG. 13 or 14, which correspond to the components in FIG. 2 or 3, are designated with the same reference numerals, and descriptions thereof are omitted where appropriate.

In the editing apparatus 1 of FIG. 13, the difference from the editing apparatus 1 of FIG. 2 is that a command editing section 71 is provided in place of the command conversion section 21.

The basic functions of the command editing section 71 are identical to those of the command conversion section 21, but when the edit text data is converted into a command, the specification data of the editing processing apparatus 4 is obtained by inquiring the editing processing apparatus 4 in advance. Furthermore, the command editing section 71 is provided with a command book 71a. In the command book 71a, a command that can be recognized (that allows an image conversion control process to be performed) by the editing processing apparatus 4 is described for each piece of the specification data of the editing processing apparatus 4.

Therefore, when the edit text data is converted into a command, the command editing section 71 inquires the editing processing apparatus 4 in order to obtain the specification data of the editing processing apparatus 4, and converts the edit text data into a command corresponding to the obtained specification data.

In the editing processing apparatus 4 of FIG. 14, the difference the editing processing apparatus 4 of FIG. 3 is that a command recognition section 81 is provided in place of the command recognition section 42.

The command recognition section 81, whose basic functions are identical to those of the command recognition section 42, reads its own specification data 81a in response to an inquiry from the command editing section 71 of FIG. 13, and transmits it to the editing apparatus 1.

Figure 15:
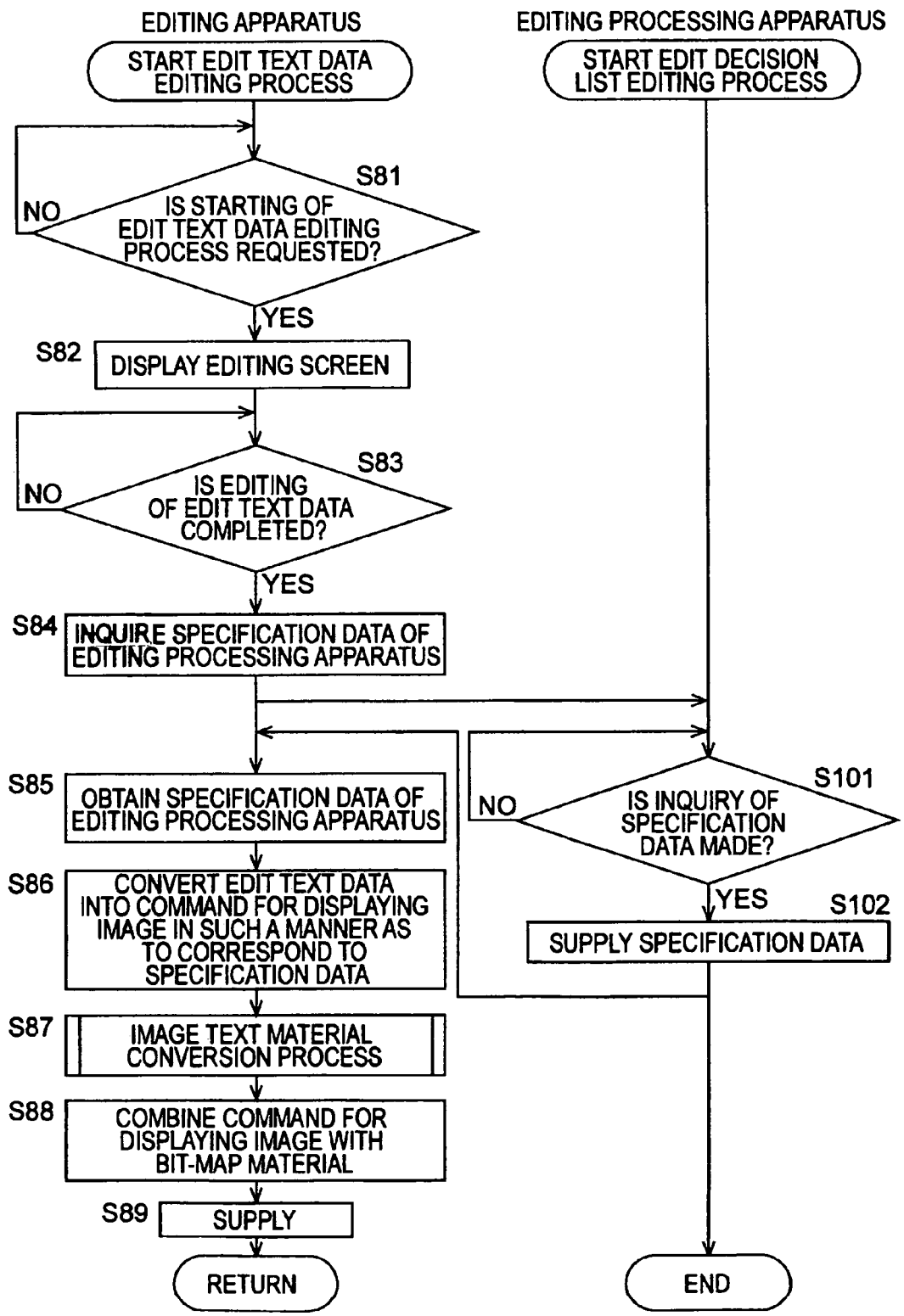
FIG. 15 is a flowchart illustrating an edit text data editing process of FIG. 4 by using the editing apparatus of FIG. 13 and the editing processing apparatus of FIG. 14.

Next, referring to the flowchart in FIG. 15, a description will be given of an edit text data editing process by the editing apparatus 1 of FIG. 13 and the editing processing apparatus 4 of FIG. 14. The processing of steps S81 to S83 and the processing of steps S87 to S89 in the flowchart of FIG. 15 are identical to the processing of steps S11 to S13 and the processing of steps S15 to S17 in the flowchart of FIG. 5, and accordingly, descriptions thereof are omitted.

When it is determined in step S83 that the editing of the edit text data is completed, in step S84, the command editing section 71 inquires the editing processing apparatus 4 of the specification data.

In step S101, the command recognition section 81 determines whether or not an inquiry of specification data is made from the editing apparatus 1. When an inquiry is made as a result of the process in step S84, in step S102, the command recognition section 81 reads the specification data 81a stored in itself and supplies it to the editing apparatus 1.

In step S85, the command editing section 71 obtains the specification data of the editing processing apparatus 4, which is supplied as a result of the process in step S102.

In step S86, based on the obtained specification data, the command editing section 71 refers to the command book 71a in order to read a command that can be recognized by the editing processing apparatus 4 (that allows an image editing control process to be performed), and converts it into a command in such a manner as to correspond to the edit text data.

As a result of the above processing, even if the editing apparatus 1 is used in combination with the editing processing apparatus 4 of various specifications, it is possible to generate a command in accordance with the processing performance of the editing processing apparatus 4. Thus, it becomes possible to allow the editing processing apparatus 4 to stably implement an image editing control process.

In the foregoing, an example has been described in which, based on the edit text data edited in real time by the editing apparatus 1, the video material is edited and furthermore is distributed. Alternatively, for example, the edit text data may be provided in the video material, so that, when the video material is read, this can be edited and distributed.

Figure 16:
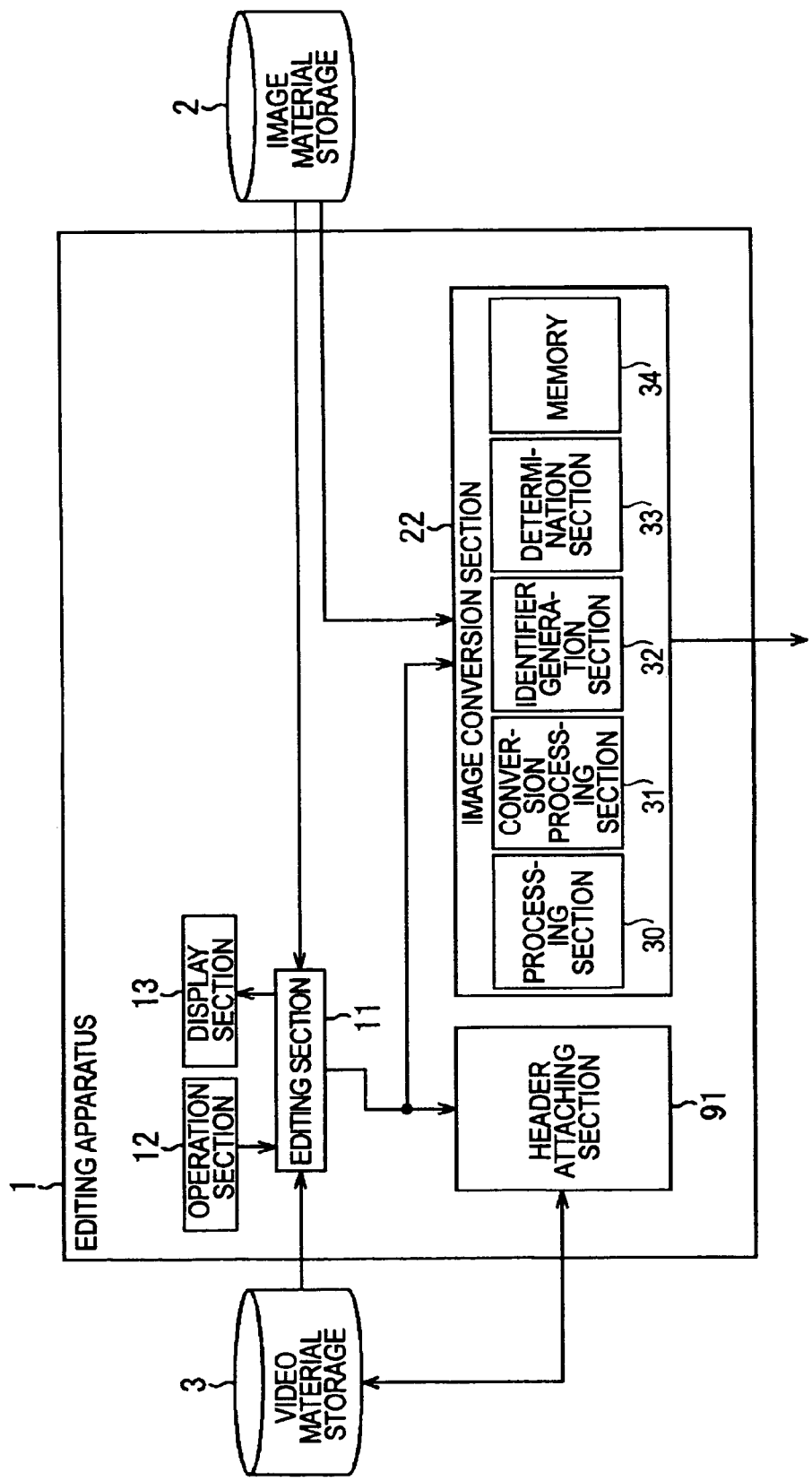
FIG. 16 shows another configuration of the editing apparatus of FIG. 1.
Figure 17:
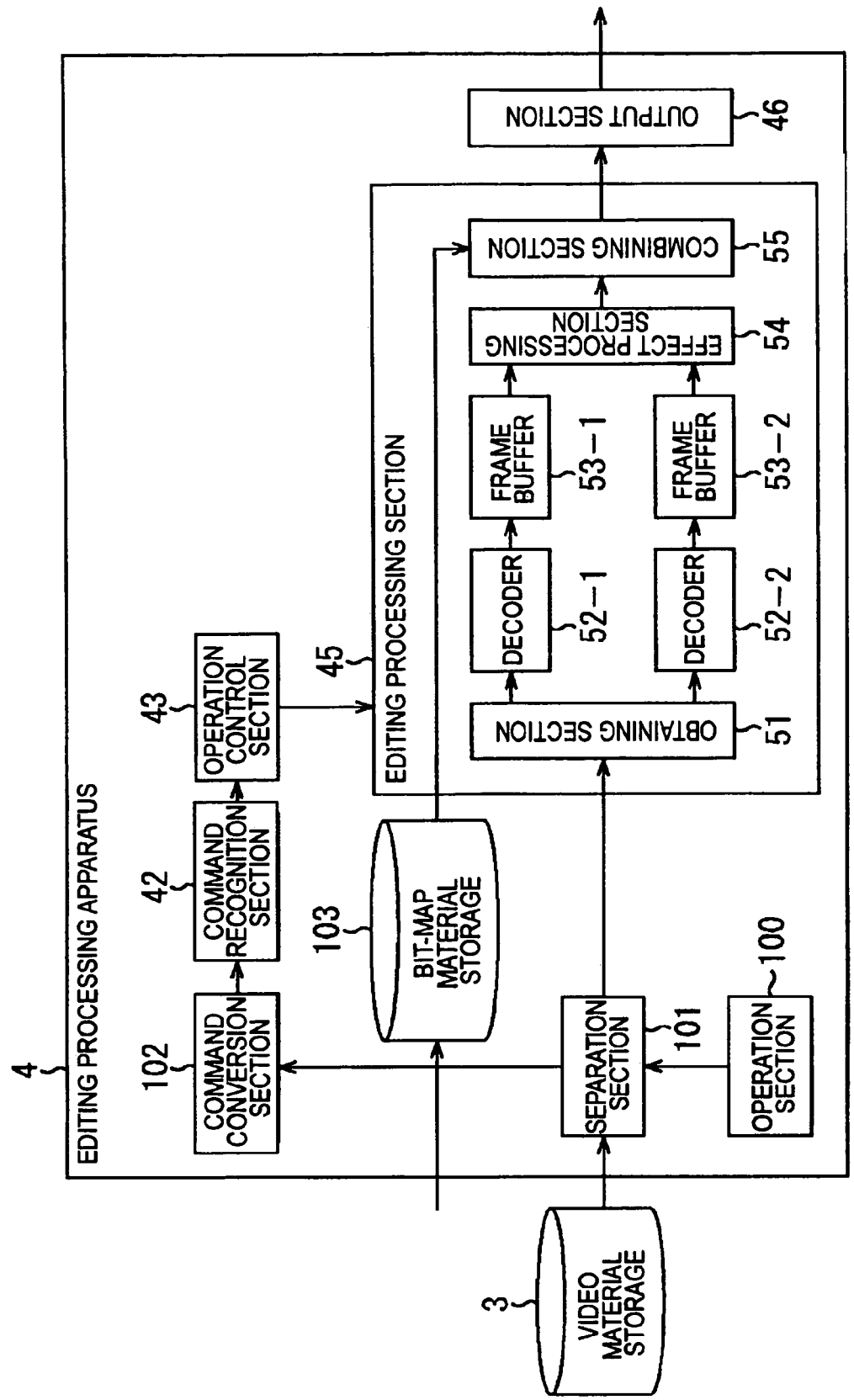
FIG. 17 shows another configuration of the editing processing apparatus of FIG. 1.

FIGS. 16 and 17 show the editing apparatus 1 and the editing processing apparatus 4 in which the edit text data is provided in the video material, so that, when the video material is read, this can be edited and distributed. Components in FIGS. 16 and 17, which correspond to the components of the editing apparatus 1 and the editing processing apparatus 4 in FIGS. 2 and 3, are designated with the same reference numerals, and descriptions thereof are omitted where appropriate.

In the editing apparatus 1 of FIG. 16, the difference from the editing apparatus 1 of FIG. 2 is that the conversion section 14 is omitted, only the image text conversion section 22 remains, and a header attaching section 91 is provided in place of the command conversion section 21.

The header attaching section 91 attaches the edit text data supplied from the editing section 11 to the header of the video material stored in the video material storage 3.

In the editing processing apparatus 4 of FIG. 17, the difference from the editing processing apparatus 4 of FIG. 3 is that the separation section 41 is omitted, and an operation section 100, a separation section 101, a command conversion section 102, and a bit-map material storage 103 are provided.

The operation section 100 includes a keyboard, operation buttons, and the like, and is operated by the user when a distribution process is instructed. When the video material stored in the video material storage 3 is read, the separation section 101 separates the edit text data described in the header part and the video material, supplies the edit text data to the command conversion section 102, and supplies the video material to the obtaining section 51 of the editing processing section 45.

The command conversion section 102, whose basic functions are identical to those of the command conversion section 21, converts the edit text data supplied from the separation section 101 into a command that can be recognized by the command recognition section 42 and supplies it to the command recognition section 42.

The basic functions of the bit-map material storage 103 are identical to those of the bit-map material storage 44. Whereas the bit-map material storage 44 obtains and stores the bit-map material supplied from the separation section 41, the bit-map material storage 103 stores as is the bit-map material supplied from the editing apparatus 1.

Figure 18:
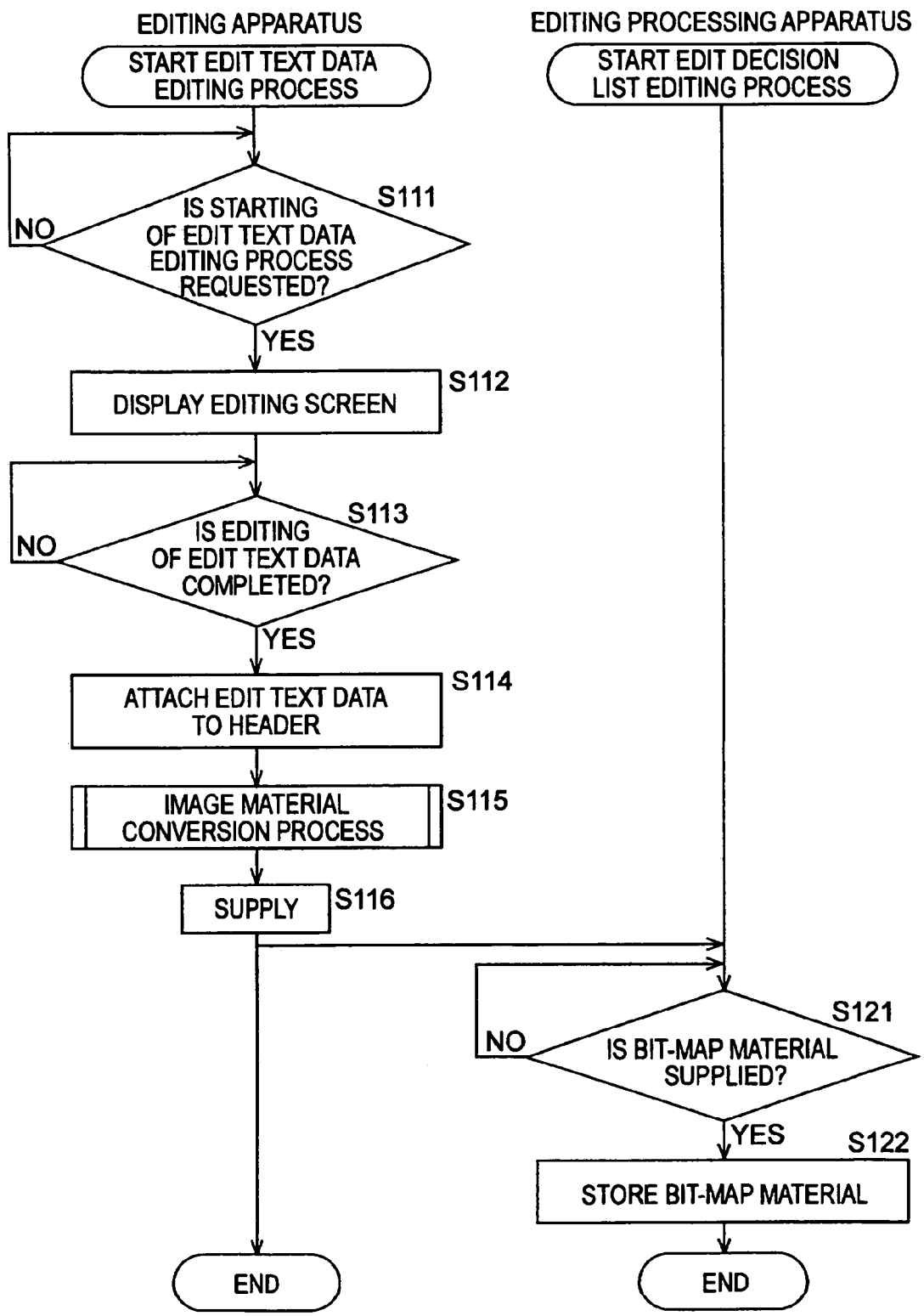
FIG. 18 is a flowchart illustrating an edit text data editing process of FIG. 4 by using the editing apparatus of FIG. 16 and the editing processing apparatus of FIG. 17.

Next, referring to the flowchart in FIG. 18, a description will be given of an edit text data editing process by the editing apparatus 1 of FIG. 16. The processing of steps S111 to S113 and step S115 in the flowchart of FIG. 18 are identical to the processing of steps S11 to S13 and step S15 in the flowchart of FIG. 5, and accordingly, descriptions thereof are omitted.

Figure 19:
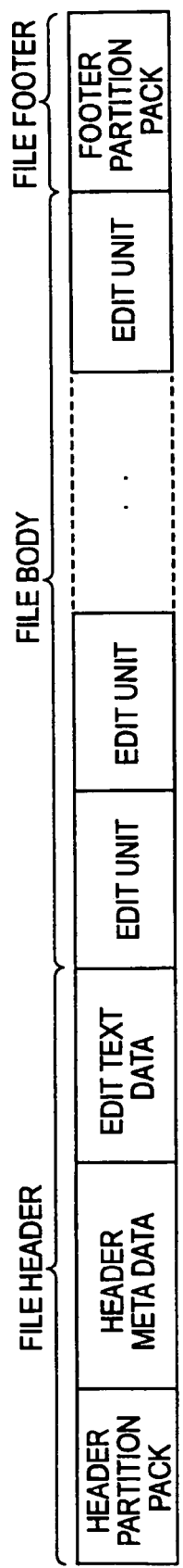
FIG. 19 illustrates an example in which edit text data is inserted into video material.

When it is determined in step S113 that the editing of the edit text data is completed, in step S114, based on the edit text data, the header attaching section 91 reads predetermined video material of the video material storage 3, attaches the edit text data supplied from the editing section 11 to the header thereof, as shown in, for example, FIG. 19, and stores it in the original video material storage 3.

Referring now to FIG. 19, the structure of the video material is described. The MXF file is structured in such a way that a header (File Header), a body (File Body), and a footer (File Footer) are arranged in that order from the beginning thereof.

In the header, a header partition pack (Header Partition Pack), header meta data (Header Meta data), and edit text data (Edit Text Data) are sequentially arranged in that order from the beginning thereof. In the header partition pack, data for specifying a header, the format of data arranged in the body, information for indicating the file format, etc., are arranged. In the header meta data, for example, meta data in units of files, such as the file creation day and information for data arranged in the body, is arranged. The edit text data is edited by the editing section 11 and is attached to the header of the MXF file by the header attaching section 91, as shown in FIG. 19.

The footer is formed of a header partition pack, and in the header partition pack, data for specifying a footer is arranged.

The body is formed of one or more edit units (Edit Units). The edit unit is the unit of one frame, and AV data for one frame and others are arranged therein.

The description now returns to the flowchart in FIG. 18.

In step S116, the image text conversion section 22 supplies a bit-map material to the editing processing apparatus 4.

In step S121, the bit-map material storage 103 of the editing processing apparatus 4 determines whether or not the bit-map material has been supplied from the editing apparatus 1, and repeats the process until it is supplied. When it is determined in step S121 that the bit-map material is supplied as a result of the process in step S116, in step S122, the bit-map material storage 103 obtains and stores the supplied bit-map material.

As a result of the above processing, the edit text data is described in the header of the MXF format, which is video material. At this time, based on the edit text data, the bit-map material composed of image material or subtitles text is supplied to the editing processing apparatus 4, where it is stored.

Figure 20:
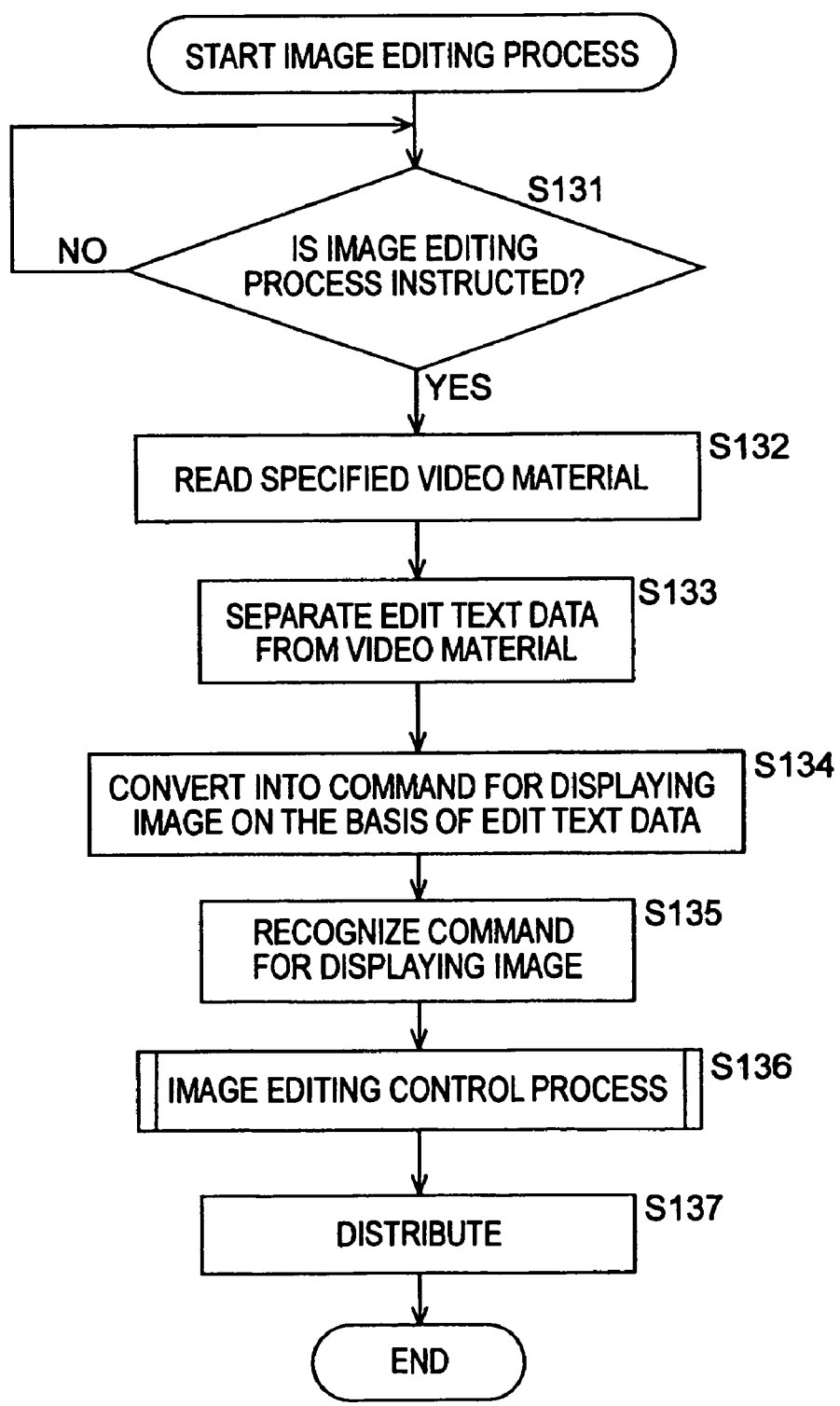
FIG. 20 is a flowchart illustrating an image editing process of FIG. 4 by using the editing processing apparatus of FIG. 17.

Next, referring to the flowchart in FIG. 20, a description will be given of an image editing process (distribution process) by the editing processing apparatus 4.

In step S131, the separation section 101 determines whether or not the operation section 100 is operated, predetermined video material is specified, and an image editing process (distribution) is instructed, and repeats the process until predetermined video material is specified and an image editing process (distribution) is instructed. When it is determined in step S131 that the predetermined video material is specified and the image editing process (distribution) is instructed, the process proceeds to step S132.

In step S132, the separation section 101 reads the specified video material from the video material storage 3. Then, in step S133, the separation section 101 separates the read video material into edit text data and video material body, and supplies them to the command conversion section 102 and the obtaining section 51, respectively. More specifically, the separation section 101 extracts the edit text data from the header part of the video material, supplies it to the command conversion section 102, and supplies the main body of the remaining video material to the obtaining section 51.

In step S134, the command conversion section 102 converts the supplied edit text data into a command that can be recognized by the command recognition section 42 and supplies it to the command recognition section 42.

In step S135, the command recognition section 42 recognizes the supplied command and supplies the recognition result to the operation control section 43.

In step S136, based on the recognition result supplied from the command recognition section 42, the operation control section 43 allows the editing processing section 45 to operate to perform an image editing control process for editing the video material. The image editing control process is identical to the process described with reference to FIG. 12, and accordingly, a description thereof is omitted.

In step S137, the output section 46 distributes the edited video material to the AV devices 6-1 and 6-2 via the network 5.

As a result of the above processing, it becomes possible to allow the edit text data to be contained in the video material. Thus, by synchronizing the timing at which the edit text data is edited with the timing at which video material is distributed (the timing at which the image editing process is performed), not only can the video material be distributed while editing the video material in real time, but also the image can be edited and distributed in a state in which these timings are separated.

According to the above-described processing, it is possible to edit the method of displaying the video material in real time and to easily display the image material and the subtitles in an overlapping manner.

The above-described series of processing can be performed by hardware and can also be performed by software. When a series of processing is to be performed by software, the program forming the software is installed from a recording medium into a computer incorporated into dedicated hardware or into, for example, a general-purpose computer capable of performing various kinds of functions by installing various kinds of programs.

FIG. 21 shows the configuration of an embodiment of a personal computer when the electrical internal configuration of the editing apparatus 1 of FIGS. 2, 13, and 16 or the editing processing apparatus 4 of FIG. 3, 14, and 17 is implemented by software. A CPU 201 of the personal computer controls the overall operation of the personal computer. Furthermore, when instructions are input from an input section 206 including a keyboard, a mouse, and the like via a bus 204 and an input/output interface 205 from the user, the CPU 201 executes a program stored in a ROM (Read Only Memory) 202 in response to the instructions. Alternatively, the CPU 201 loads, into a RAM (Random Access Memory) 203, a program that is read from a magnetic disk 221, an optical disc 222, a magneto-optical disc 223, or a semiconductor memory 224 connected to a drive 210 and that is installed into a storage section 208, and executes the program. As a result, the functions of the editing apparatus 1 of FIGS. 2, 13, and 16 or the functions of the editing processing apparatus 4 of FIGS. 3, 14, and 17 are implemented by software. Furthermore, the CPU 201 controls a communication section 209 in order to perform communication with the outside and to perform data exchange.

A recording medium for recording a program, as shown in FIG. 21, is formed of a packaged medium composed of the magnetic disk 221 (including a flexible disk), the optical disc 222 (including a CD-ROM (Compact Disc-Read Only Memory) or a DVD (Digital Versatile Disc)), the magneto-optical disk 223 (including an MD (Mini-Disc)), or the semiconductor memory 224, the medium being distributed to provide the program to the user separately from the computer. Alternatively, the recording medium is formed of a ROM 202 having a program recorded therein, which is provided to the user in a state in which it is pre-incorporated into the computer, a hard disk drive contained in the storage section 208, and so on.

In this specification, the steps describing a program recorded on a recording medium include not only processing which is carried out chronologically in the written order but also processing which is executed concurrently or individually although it is not necessarily processed chronologically.

In this specification, the system designates an overall apparatus formed of a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system comprising:
a first image processing apparatus including:
an edit section which edits a text data for processing a first image,
a command conversion section which converts a edit text data edited by the edit section into a command for processing the first image,
a image conversion section which converts a second image used for processing the first image or a subtitle text data into an image in a predetermined format on the basis of the edit text data;
an output section which outputs the command and the image in the predetermined format to a second image processing apparatus;
an identifier generation section generating an identifier for identifying the information of the second image or the text used as subtitles processed by the processing section;
an identifier storage section storing the identifier generated by the identifier generation section; and
a determination section determining whether or not the identifier generated by the identifier generation section is stored in advance in the identifier storage section,
wherein, only when the determination result of the determination section shows that the identifier generated by the identifier generation section is not stored in the identifier storage section, the processing section processes the second image used for the processing on the first image based on the edit text data, or the subtitles text, on the basis of the edit text data; and
wherein the second image processing apparatus includes:
a receiving section which receives the command and the image in the predetermined format from the first image processing apparatus,
a processing section which processes the first image on the basis of both the command and the image in the predetermined format.

2. An information processing apparatus comprising:
an editing section editing edit text data for processing a first image;
a command conversion section converting the edit text data edited by the editing section into a command;
a processing section processing a second image used for processing the first image based on the edit text data, or subtitles text, on the basis of the edit text data;
an image conversion section converting the second image or the subtitles text processed by the processing section into an image in a predetermined format;
an output section outputting the command and the image in the predetermined format to an image processing apparatus;
an identifier generation section generating an identifier for identifying the information of the second image or the text used as subtitles processed by the processing section;
an identifier storage section storing the identifier generated by the identifier generation section; and
a determination section determining whether or not the identifier generated by the identifier generation section is stored in advance in the identifier storage section,
wherein, only when the determination result of the determination section shows that the identifier generated by the identifier generation section is not stored in the identifier storage section, the processing section processes the second image used for the processing on the first image based on the edit text data, or the subtitles text, on the basis of the edit text data.

3. The information processing apparatus according to claim 2, wherein the edit text data contains information indicating the definition of layout, information indicating the definition of effects, information indicating a method for displaying the first image, information indicating a method for displaying the second image, and information indicating a method for displaying the text used as subtitles.

4. The information processing apparatus according to claim 3, wherein, when the second image used for processing the first image based on the edit text data or the text used as subtitles is processed on the basis of the edit text data, the processing section processes the information of the second image and the text used as subtitles on the basis of the information indicating the method for displaying the second image and the information indicating the method for displaying text used as subtitles, respectively.

5. The information processing apparatus according to claim 2, wherein the identifier generation section generates an identifier by using a parameter contained in the information indicating the method for displaying the second image or contained in the information indicating the method for displaying the text used as subtitles processed by the processing section.

6. The information processing apparatus according to claim 5, wherein the identifier generation section calculates a hashed value by using a parameter contained in the information indicating the method for displaying the second image or contained in the information indicating the method for displaying the text used as subtitles processed by the processing section, and generates an identifier from the hashed value.

7. The information processing apparatus according to claim 2, further comprising:
a specification data obtaining section obtaining specification data of the image processing apparatus; and
a command storage section storing a command that can be recognized for each piece of the specification data of the image processing apparatus,
wherein the command conversion section converts the edit text data edited by the editing section into a command that can be recognized by the image processing apparatus on the basis of the specification data of the image processing apparatus, the specification data being obtained by the specification data obtaining section.

8. An information processing method comprising the steps of:
editing edit text data for processing a first image;
converting the edit text data edited in the editing step into a command that can be recognized by an image processing apparatus;
processing a second image used for processing the first image based on the edit text data, or subtitles text, on the basis of the edit text data;
converting the second image or the subtitles text processed in the processing step into an image in a predetermined format;
outputting the command and the image in the predetermined format to the image processing apparatus;
generating an identifier for identifying the information of the second image or the text used as subtitles processed in the processing step;
storing the identifier generated in the identifier generation step; and
determining whether or not the identifier generated in the identifier generation step is stored in advance in the identifier storing step,
wherein, only when the determination results of the determination step shows that the identifier generated in the identifier generation step is not stored in the identifier storing step, the processing step processes the second image used for the processing on the first image based on the edit text data, or the subtitles text, on the basis of the edit text data.

9. A computer-readable medium storing a program executed on a computer, the program comprising the steps of:
editing edit text data for processing a first image;
converting the edit text data edited in the editing step into a command that can be recognized by an image processing apparatus;
processing a second image used for processing the first image based on the edit text data or the processing of subtitles text, on the basis of the edit text data;
converting the second image or the subtitles text processed in the processing step into an image in a predetermined format;
outputting the command and the image in the predetermined format to the image processing apparatus;
generating an identifier for identifying the information of the second image or the text used as subtitles processed in the processing step;
storing the identifier generated in the identifier generation step; and
determining whether or not the identifier generated in the identifier generation step is stored in advance in the identifier storing step,
wherein, only when the determination result of the determination step shows that the identifier generated in the identifier generation step is not stored in the identifier storing step, the processing step processes the second image used for the processing on the first image based on the edit text data, or the subtitles text, on the basis of the edit text data.

* * * * *